United States Patent
Saegusa et al.

(10) Patent No.: US 8,785,564 B2
(45) Date of Patent: Jul. 22, 2014

(54) RESIN MATERIAL

(71) Applicant: Fuji Xerox Co., Ltd., Tokyo (JP)

(72) Inventors: Hiroshi Saegusa, Ashigarakami-gun (JP); Hisae Yoshizawa, Ashigarakami-gun (JP); Tomoko Miyahara, Ashigarakami-gun (JP); Kazunori Anazawa, Ebina (JP); Kaoru Torikoshi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/765,330

(22) Filed: Feb. 12, 2013

(65) Prior Publication Data

US 2014/0051811 A1 Feb. 20, 2014

(30) Foreign Application Priority Data

Aug. 20, 2012 (JP) ................ 2012-181837

(51) Int. Cl.
*C08F 20/10* (2006.01)

(52) U.S. Cl.
USPC ................. 525/326.3; 525/326.5

(58) Field of Classification Search
None
See application file for complete search history.

(56) References Cited

U.S. PATENT DOCUMENTS

| | | | | |
|---|---|---|---|---|
| 3,480,591 A * | 11/1969 | Zenner et al. | ................. | 525/403 |
| 3,789,033 A * | 1/1974 | Hageman et al. | ................. | 528/45 |
| 4,225,695 A * | 9/1980 | Schuster et al. | ................. | 528/75 |
| 4,762,884 A * | 8/1988 | Goyert et al. | ................. | 525/28 |
| 5,646,228 A * | 7/1997 | Gras et al. | ................. | 528/45 |
| 6,436,540 B1 * | 8/2002 | Garcia et al. | ................. | 428/423.1 |
| 6,620,877 B2 * | 9/2003 | Klanica et al. | ................. | 524/506 |
| 8,436,124 B2 * | 5/2013 | Yoshizawa et al. | ................. | 528/44 |
| 2008/0285133 A1 * | 11/2008 | Yoneyama et al. | ................. | 359/580 |
| 2010/0063222 A1 * | 3/2010 | Oikawa et al. | ................. | 525/474 |
| 2010/0075245 A1 * | 3/2010 | Watanabe et al. | ................. | 430/123.41 |
| 2010/0093951 A1 * | 4/2010 | Oikawa et al. | ................. | 525/474 |

FOREIGN PATENT DOCUMENTS

| | | |
|---|---|---|
| JP | A-02-279710 | 11/1990 |
| JP | A-04-018475 | 1/1992 |
| JP | A-06-136223 | 5/1994 |
| JP | A-07-196982 | 8/1995 |
| JP | A-07-206973 | 8/1995 |
| JP | A-08-295843 | 11/1996 |
| JP | A-10-060367 | 3/1998 |
| JP | A-10-142990 | 5/1998 |
| JP | A-2005-059591 | 3/2005 |
| JP | A-2006-176632 | 7/2006 |
| JP | A-2007-031690 | 2/2007 |
| JP | A-2012-021111 | 2/2012 |

OTHER PUBLICATIONS

Nov. 20, 2012 Office Action issued in Japanese Patent Application No. 2012-181837 (with translation).

* cited by examiner

*Primary Examiner* — Robert S Loewe
(74) *Attorney, Agent, or Firm* — Oliff PLC

(57) ABSTRACT

A resin material contains a polymer of a composition containing an isocyanate and an acrylic resin having OH-group-containing side chains in which a proportion of OH-group-containing side chains each having 6 or more carbon atoms relative to all of the OH-group-containing side chains is about 76 mol % or more and about 100 mol % or less.

7 Claims, 6 Drawing Sheets

RESIN MATERIAL

CROSS-REFERENCE TO RELATED APPLICATIONS

This application is based on and claims priority under 35 USC 119 from Japanese Patent Application No. 2012-181837 filed Aug. 20, 2012.

BACKGROUND (i) Technical Field

The present invention relates to a resin material.

(ii) Related Art

In various fields, resin materials have been used to form protective films on surfaces in order to suppress generation of scratches. For example, such resin materials are applied as protective films for protecting portable devices having displays such as cellular phones and portable game machines; windowpanes; lenses of eyeglasses; windowpanes and bodies of automobiles; recording surfaces of optical discs such as CDs, DVDs, and BDs; solar cell panels and panels for reflecting sunlight; and endless belts and rollers for image forming apparatuses that are used for fixing members, intermediate transfer members, recording medium transport members, and the like of image forming apparatuses.

SUMMARY

According to an aspect of the invention, there is provided a resin material containing a polymer of a composition containing an isocyanate and an acrylic resin having OH-group-containing side chains in which a proportion of OH-group-containing side chains each having 6 or more carbon atoms relative to all of the OH-group-containing side chains is about 76 mol % or more and about 100 mol % or less.

BRIEF DESCRIPTION OF THE DRAWINGS

Exemplary embodiments of the present invention will be described in detail based on the following figures, wherein.

DETAILED DESCRIPTION

Resin Material

Figure 1:
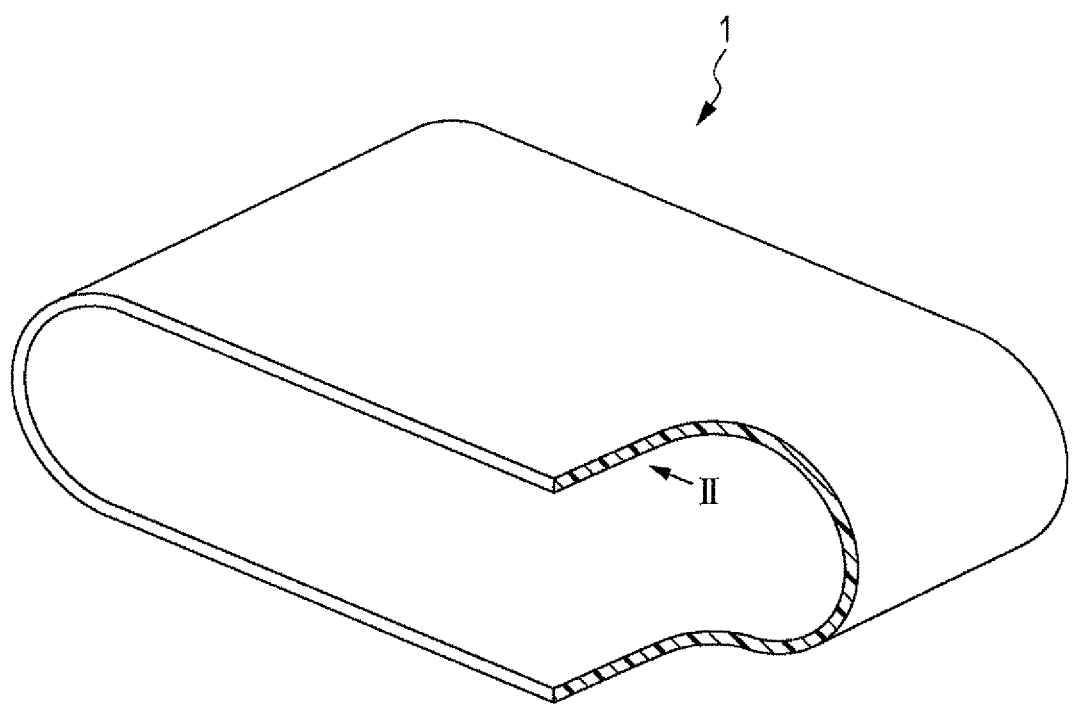
FIG. 1 is a perspective view schematically illustrating the configuration of an endless belt according to an exemplary embodiment.

A resin material according to an exemplary embodiment contains a polymer of a composition containing an isocyanate and an acrylic resin having OH-group-containing side chains in which the proportion of OH-group-containing side chains each having 6 or more carbon atoms relative to all of the OH-group-containing side chains is about 76 mol % or more and about 100 mol % or less, or 76 mol % or more and 100 mol % or less. Specific examples of the OH-group-containing side chains include a side chain containing an alcoholic OH group, a side chain containing a phenolic OH group, and a side chain containing a carboxyl group (that is, a side chain containing a OH group in a carboxyl group).

Hereafter, the "OH-group-containing side chains" may be sometimes referred to as "side-chain hydroxyl groups". The "side-chain hydroxyl groups each having 6 or more carbon atoms" may be sometimes referred to as "long-side-chain hydroxyl groups". The proportion of side-chain hydroxyl groups each having 6 or more carbon atoms relative to all of the side-chain hydroxyl groups in the acrylic resin may be sometimes referred to as a "proportion of the long-side-chain hydroxyl groups".

The resin material according to the exemplary embodiment, which satisfies the above-described conditions, is excellent in terms of capability of recovering from scratches, compared with the cases where the proportion of the long-side-chain hydroxyl groups does not satisfy the above-described range. The reason for this is not clear, but the possible mechanism is as follows.

In the polymer contained in the resin material according to the exemplary embodiment, a crosslinked structure is formed by bonding between an isocyanate and the side-chain hydroxyl groups of an acrylic resin; and the crosslinked structure probably provides the capability of recovering from scratches. Specifically, for example, when a strong impact is applied to a portion of the surface of the resin material, the resin material does not directly bounce in response to the impact but flexibly depresses once to reduce the impact and then recovers from such a depression and goes back to its original shape (that is, self-recovery); in this way, the capability of recovering from scratches (the property of recovering from scratches having been formed) is probably provided.

In the exemplary embodiment, in particular, an acrylic resin in which the proportion of the long-side-chain hydroxyl groups satisfies the above-described range is used. Accordingly, variations in the length of side chains in the acrylic resin are small and the compatibility between the acrylic resin and the isocyanate is high. Thus, during polymerization, the components in the composition are less likely distributed unevenly and polymerization is probably performed with the components evenly distributed.

For example, a polymer in which the uneven distribution is caused during polymerization may have portions having low elasticity. As a result, the capability of recovering from scratches in the resin material is probably less likely to be provided. In contrast, in the exemplary embodiment, the polymerization is evenly achieved and the resultant resin material probably has, in its entirety, the self-recovery capability; accordingly, the resin material probably has a high capability of recovering from scratches, compared with the above-described cases where the uneven distribution tends to be caused.

In the exemplary embodiment, as described above, the compatibility between the acrylic resin and the isocyanate in the composition is high. Accordingly, in particular, when the resin material is used to form a film, the film probably has high transparency and low surface roughness.

In the exemplary embodiment, the polymer may contain one or both of a fluorine atom and a silicon atom. A urethane bond formed by bonding between a OH group of the acrylic resin and the isocyanate is hydrophilic; and a fluorine atom and a silicon atom are hydrophobic. Thus, the presence of one or both of a fluorine atom and a silicon atom may cause degradation of the compatibility between the acrylic resin and the isocyanate. However, in the exemplary embodiment, as described above, the proportion of the long-side-chain hydroxyl groups satisfies the above-described range. Accordingly, even when the polymer contains one or both of a fluorine atom and a silicon atom, the compatibility between the acrylic resin and the isocyanate is high and a high capability of recovering from scratches is probably provided, compared with the cases where the proportion of the long-side-chain hydroxyl groups does not satisfy the above-described range.

In the polymer containing one or both of a fluorine atom and a silicon atom, one or both of a fluorine atom and a silicon atom are contained in at least any one of the acrylic resin, the isocyanate, and other components (that is, components other than the acrylic resin and the isocyanate) in the composition. In particular, the acrylic resin may contain one or both of a fluorine atom and a silicon atom. Specifically, for example, the acrylic resin may have a side chain containing one or both of a fluorine atom and a silicon atom.

The polymer may contain either a fluorine atom or a silicon atom, or may contain both of a fluorine atom and a silicon atom.

Recovery Proportion

The capability of recovering from scratches may be represented by, for example, a recovery proportion. That is, the recovery proportion is an indicator of the self-recovery capability (the property of recovering from distortion upon removal of a stress, the distortion being caused by the stress; that is, the degree of recovery from scratches) of the resin material.

The recovery proportion is measured with, for example, a FISCHERSCOPE HM2000 (manufactured by Fischer Instruments K.K.) as a measurement apparatus. Specifically, for example, a composition containing an acrylic resin and an isocyanate is applied to a polyimide film and polymerized to form a sample resin layer. The sample resin layer is fixed on a slide glass by using an adhesive agent and placed in the measurement apparatus. The sample resin layer is subjected to an increasing load up to 0.5 mN over 15 seconds at room temperature (23° C.) and the sample resin layer is held under the load of 0.5 mN for 5 seconds. At this time, the maximum displacement of the sample resin layer is defined as h1. After that, the load is decreased to 0.005 mN over 15 seconds and the sample resin layer is held under the load of 0.005 mN for a minute. At this time, the displacement of the sample resin layer is defined as h2. The recovery proportion [(h1−h2)/h1] is then calculated.

Hereinafter, the composition of the resin material according to the exemplary embodiment will be described.

Acrylic Resin

In the acrylic resin in the exemplary embodiment, the proportion of the long-side-chain hydroxyl groups relative to all of the side-chain hydroxyl groups is about 76 mol % or more and about 100 mol % or less, or 76 mol % or more and 100 mol % or less.

The acrylic resin is obtained by polymerization of at least one selected from a monomer at least having a hydroxyl group and a monomer having a carboxyl group. In this polymerization, another monomer having no hydroxyl groups may be additionally used.

In order to adjust the proportion of the long-side-chain hydroxyl groups in the acrylic resin to be in the above-described range, for example, the proportion of monomers used in the polymerization for the acyclic resin may be adjusted. Specifically, for example, the proportion of a monomer that is to provide a long-side-chain hydroxyl group described below may be adjusted to be in the above-described range, with respect to the total amount of a monomer having a hydroxyl group and a monomer having a carboxyl group that are used for the polymerization for the acyclic resin.

Examples of a monomer having a hydroxyl group include ethylenic monomers having hydroxyl groups such as hydroxymethyl (meth)acrylate, hydroxyethyl (meth)acrylate, hydroxypropyl (meth)acrylate, hydroxybutyl (meth)acrylate, and N-methylolacrylamine.

Examples of a monomer having a carboxyl group include (meth)acrylic acid, crotonic acid, itaconic acid, fumaric acid, and maleic acid.

At least one selected from a monomer having a hydroxyl group and a monomer having a carboxyl group may be a single monomer or two or more monomers.

The monomer that is to provide a long-side-chain hydroxyl group is, for example, a monomer in which ε-caprolactone or a diol compound having 6 or more carbon atoms is added to the monomer having a hydroxyl group or the monomer having a carboxyl group.

Specific examples of this monomer include a monomer in which 1 mole or more and 10 moles or less of ε-caprolactone is added to 1 mole of hydroxymethyl (meth)acrylate; and a monomer in which hexanediol, heptanediol, octanediol, nonanediol, or decanediol is added to hydroxymethyl (meth)acrylate.

The monomer that is to provide a long-side-chain hydroxyl group may be a single monomer or two or more monomers. Use of a single monomer tends to provide an acrylic resin in which variations in the length of the side chains are small.

A monomer having no hydroxyl groups is not particularly limited as long as the monomer is an ethylenic monomer that is copolymerizable with the above-described monomer containing a hydroxyl group. Examples of the monomer include (meth)acrylic acid alkyl esters such as methyl (meth)acrylate, ethyl (meth)acrylate, propyl (meth)acrylate, butyl (meth)acrylate, n-propyl (meth)acrylate, n-butyl (meth)acrylate, isobutyl (meth)acrylate, 2-ethylhexyl (meth)acrylate, n-octyl (meth)acrylate, and n-dodecyl (meth)acrylate. Such a monomer may be used alone or in combination of two or more thereof.

An acrylic resin having a side chain containing a fluorine atom is obtained by, for example, using a monomer containing a fluorine atom. The monomer containing a fluorine atom is not particularly limited and may be, for example, a monomer having a side chain containing a fluorine atom in which the number of carbon atoms is 2 or more and 20 or less. The number of fluorine atoms in a molecule of the monomer containing a fluorine atom is also not particularly limited and may be, for example, 1 or more and 25 or less, or 9 or more and 17 or less.

Specific examples of the monomer containing a fluorine atom include hexafluoro-2-propyl acrylate, 2-(perfluorobutyl)ethyl acrylate, 2-(perfluorohexyl)ethyl acrylate, hexafluoro-2-propyl methacrylate, 2-(perfluorohexyl)ethyl methacrylate, and perfluorohexylethylene. These monomers may be used alone or in combination of two or more thereof.

An acrylic resin having a side chain containing a silicon atom is obtained by, for example, using a monomer containing a silicon atom.

The monomer containing a silicon atom is not particularly limited and may be, for example, a monomer having a siloxane bond. Specifically, for example, the monomer may be a silicone represented by the following general formula (A).

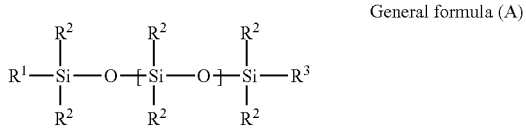

General formula (A)

In the general formula (A), $R^1$ represents an alkyl group having 1 to 10 carbon atoms, an amino group, a hydroxyl group, a methoxy group, an ethoxy group, an alkylamino group having 1 to 10 carbon atoms, an aminoalkyl group having 1 to 10 carbon atoms, a hydroxyalkyl group having 1 to 10 carbon atoms, an alkoxy group having 1 to 10 carbon atoms, a methoxyalkyl group in which the alkyl group has 1 to 10 carbon atoms, an ethoxyalkyl group in which the alkyl group has 1 to 10 carbon atoms, an alkyl methacrylate group in which the alkyl group has 1 to 10 carbon atoms, or an alkyl acrylate group in which the alkyl group has 1 to 10 carbon atoms; $R^2$ represents a methyl group, a phenyl group, or an ethyl group; and $R^3$ represents an alkyl methacrylate group in which the alkyl group has 1 to 10 carbon atoms, or an alkyl acrylate group in which the alkyl group has 1 to 10 carbon atoms. In the general formula (A), the number (n) of the group in the parentheses —[Si($R^2$)$_2$—O]— is not particularly limited and may be, for example, 3 or more and 1000 or less.

The number-average molecular weight of the monomer having a siloxane bond may be, for example, 250 or more and 50000 or less, or may be 500 or more and 20000 or less.

Specific examples of the monomer having a siloxane bond include SILAPLANE FM-0701, FM-0711, FM-0721, and FM-0725 (these are manufactured by JNC CORPORATION).

An acrylic resin containing a fluorine atom and a silicon atom is obtained by, for example, using the monomer containing a fluorine atom and the monomer containing a silicon atom. An example of the acrylic resin containing a fluorine atom and a silicon atom is an acrylic resin obtained by using the monomer containing a fluorine atom and the monomer having a siloxane bond.

The acrylic resin in the exemplary embodiment is synthesized by, for example, mixing the above-described monomers and subjecting the mixed monomers to radical polymerization, ionic polymerization, or the like and then to purification.

The acrylic resin used in the exemplary embodiment may be a single acrylic resin or two or more acrylic resins.

As described above, the proportion of the long-side-chain hydroxyl groups in the acrylic resin is about 76 mol % or more, or 76 mol % or more, desirably 85 mol % or more, and may be about 100 mol % or 100 mol %.

As described above, the number of carbon atoms in each long-side-chain hydroxyl group is 6 or more, for example, 6 or more and 60 or less, may be 10 or more and 30 or less.

When the acrylic resin has two or more long-side-chain hydroxyl groups that are different in the number of carbon atoms, the difference in the number of carbon atoms between the long-side-chain hydroxyl group having the largest number of carbon atoms and the long-side-chain hydroxyl group having the smallest number of carbon atoms may be, for example, 10 or less, or may be 6 or less.

The proportion of side-chain hydroxyl groups relative to all the side chains in the acrylic resin may be, for example, 10 mol % or more and 80 mol % or less.

When the acrylic resin has a side chain containing a fluorine atom, the proportion of the side chains containing a fluorine atom relative to all the side chains may be, for example, 1 mol % or more and 70 mol % or less, 5 mol % or more and 50 mol % or less, or about 5 mol % or more and about 25 mol % or less, or 5 mol % or more and 25 mol % or less.

When the acrylic resin has a side chain containing a silicon atom, the proportion of the monomer containing a silicon atom relative to all the monomers used in the synthesis of the acrylic resin may be, for example, 5% or more by mass and 50% or less by mass, or may be 10% or more by mass and 30% or less by mass.

The acrylic resin may have a hydroxyl value of about 30 mgKOH/g or more and about 250 mgKOH/g or less, or 30 mgKOH/g or more and 250 mgKOH/g or less.

When the hydroxyl value is equal to or more than the lower limit, a urethane resin having a high crosslinking density may be synthesized. On the other hand, when the hydroxyl value is equal to or less than the upper limit, a urethane resin having appropriate flexibility may be probably synthesized.

The hydroxyl value is preferably 50 mgKOH/g or more and 200 mgKOH/g or less.

The term "hydroxyl value" denotes the number of mg of potassium hydroxide required for acetylating hydroxyl groups in 1 g of a sample. In the exemplary embodiment, the hydroxyl value is measured in accordance with the method defined in JIS K0070-1992 (potentiometric titration). In the case where a sample is not dissolved, a solvent such as dioxane or THF is used for the sample.

Isocyanate

The isocyanate functions as a crosslinking agent that crosslinks the acrylic resins or, in the case of using a long chain polyol described below, the acrylic resin and the long chain polyol, or the long chain polyols.

The isocyanate is not particularly restricted. Examples of the isocyanate include diisocyanates such as methylene diisocyanate, toluene diisocyanate, hexamethylene diisocyanate, and isophorone diisocyanate; and polyisocyanates such as isocyanate compounds prepared by subjecting such diisocyanate monomers to isocyanurate modification, adduct modification, or biuret modification. As for such an isocyanate, a single isocyanate or two or more isocyanates may be used.

As for the content of the isocyanate, the number of moles of isocyanate groups may be 0.5 times or more and 3 times or less the number of moles of hydroxyl groups of the acrylic resin (in the case of using the long chain polyol, the total number of moles of hydroxyl groups of the acrylic resin and the polyol).

Long Chain Polyol

In the exemplary embodiment, the composition may optionally contain a long chain polyol. The long chain polyol contains plural hydroxyl groups that are all connected together through a chain containing 6 or more carbon atoms (the number of carbon atoms in a linear chain portion through which the hydroxyl groups are connected together).

The long chain polyol is not particularly restricted. Examples of such a long chain polyol include bifunctional polycaprolactone diols that are compounds represented by the following general formula (1), trifunctional polycaprolactone triols that are compounds represented by the following general formula (2), and tetrafunctional polycaprolactone polyols. Such a long chain polyol may be used alone or in combination of two or more thereof.

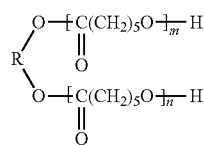
(1)

In the formula (1), R represents any one of $C_2H_4$, $C_2H_4OC_2H_4$, and $C(CH_3)_2(CH_2)_2$; and m and n represent an integer of 4 or more and 35 or less.

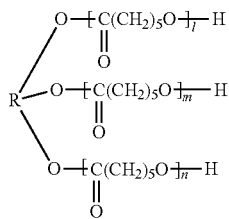
(2)

In the formula (2), R represents any one of $CH_2CHCH_2$, $CH_3C(CH_2)_2$, and $CH_3CH_2C(CH_2)_3$; and l+m+n satisfies an integer of 3 or more and 30 or less.

The long chain polyol may contain a fluorine atom. Examples of a long chain polyol containing a fluorine atom include 1H,1H,9H,9H-perfluoro-1,9-nonanediol, fluorinated tetraethylene glycol, and 1H,1H,8H,8H-perfluoro-1,8-octanediol.

The number of functional groups of the long chain polyol (that is, the number of hydroxyl groups contained in a single molecule of the long chain polyol) may be, for example, 2 or more and 5 or less, or 2 or more and 3 or less.

The long chain polyol may be added, for example, such that a ratio (B)/(A) is 0.1 or more and 10 or less, or 1 or more and 4 or less, where (A) represents the total molar amount of hydroxyl groups contained in all the acrylic resins used for the polymerization and (B) represents the total molar amount of hydroxyl groups contained in all the long chain polyols used for the polymerization.

The long chain polyol may have a hydroxyl value of 30 mgKOH/g or more and 300 mgKOH/g or less. When the hydroxyl value is equal to or more than the lower limit, a urethane resin having a high crosslinking density may be synthesized. On the other hand, when the hydroxyl value is equal to or less than the upper limit, a urethane resin having appropriate flexibility may be probably synthesized.

The hydroxyl value is preferably 50 mgKOH/g or more and 250 mgKOH/g or less.

The term "hydroxyl value" denotes the number of mg of potassium hydroxide required for acetylating hydroxyl groups in 1 g of a sample. In the exemplary embodiment, the hydroxyl value is measured in accordance with the method defined in JIS K0070-1992 (potentiometric titration). In the case where a sample is not dissolved, a solvent such as dioxane or THF is used for the sample.

Compound Containing Silicon Atom

In the exemplary embodiment, if necessary, the composition may contain a compound containing a silicon atom.

The compound containing a silicon atom may be, for example, a compound having a substituent that reacts with the isocyanate. A specific example of the compound is a compound having at least one selected from an amino group, a hydroxyl group, a methoxy group, and an ethoxy group.

The compound containing a silicon atom is not particularly limited as long as it contains a silicon atom. For example, the compound may be a compound having a siloxane bond. Specifically, the compound may be a silicone represented by the following general formula (B).

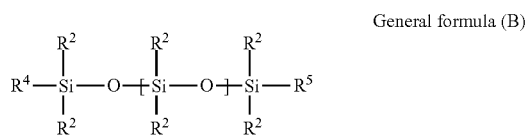
General formula (B)

In the general formula (B), $R^4$ and $R^5$ each independently represent an alkyl group having 1 to 10 carbon atoms, an amino group, a hydroxyl group, a methoxy group, an ethoxy group, an alkylamino group having 1 to 10 carbon atoms, an aminoalkyl group having 1 to 10 carbon atoms, a hydroxyalkyl group having 1 to 10 carbon atoms, an alkoxy group having 1 to 10 carbon atoms, a methoxyalkyl group in which the alkyl group has 1 to 10 carbon atoms, an ethoxyalkyl group in which the alkyl group has 1 to 10 carbon atoms, an alkyl methacrylate group in which the alkyl group has 1 to 10 carbon atoms, or an alkyl acrylate group in which the alkyl group has 1 to 10 carbon atoms; and $R^2$ is defined as with $R^2$ in the general formula (A) above. In the general formula (B), the number (n) of the group in the parentheses —[Si$(R^2)_2$—O]— is not particularly limited and may be, for example, 3 or more and 1000 or less.

Although $R^4$ and $R^5$ may be the same or different, at least one of $R^4$ and $R^5$ desirably has at least one selected from an amino group, a hydroxyl group, a methoxy group, and an ethoxy group.

The weight-average molecular weight of the compound having a siloxane bond may be, for example, 250 or more and 50000 or less, or may be 500 or more and 20000 or less.

Specific examples of the compound having a siloxane bond include KF9701, KF8008, KF8010, KF6001 (these are manufactured by Shin-Etsu Silicones), TSR160, TSR145, TSR165, and YF3804 (these are manufactured by Momentive Performance Materials Japan LLC).

The proportion of the compound having a siloxane bond relative to the total mass of the composition may be, for example, 1% or more by mass and 60% or less by mass, may be 2% or more by mass and 40% or less by mass, or may be 5% or more by mass and 30% or less by mass.

Polymerization Method

Hereinafter, a method for forming a resin material (polymerization method for composition) according to an exemplary embodiment will be described.

As an example of a method for forming a resin material, a method for forming a resin layer sample in which the resin material is formed on a polyimide film will be described. Specifically, for example, the acrylic resin, the isocyanate, and, if necessary, the long chain polyol are mixed to prepare a composition. The composition is subsequently defoamed under a reduced pressure and then applied (cast) onto, for example, a polyimide film having a thickness of 90 μm. After that, the polyimide film having the composition thereon is heated at 85° C. for 60 minutes and at 160° C. for an hour to cure the composition. Thus, a resin material containing a polymer of the composition is obtained.

Practically, a base member onto which the composition is applied is not limited to the above-described polyimide film and may be a member of which surface is intended to be protected.

Whether the thus-obtained polymer contained in the resin material is a polymer of a composition containing an isocyanate and an acrylic resin having a proportion of long-side-chain hydroxyl groups in the above-described range or not may be confirmed by, for example, the following method. Specifically, for example, the obtained resin material is analyzed by pyrolysis GC-MS (pyrolysis gas chromatography mass spectrometry). That is, the obtained resin material is pyrolyzed to monomer units of the acrylic resin. Mass spectrometry of the pyrolyzed products reveals the structures and proportions of monomers used for synthesizing the acrylic resin. Thus, the proportion of long-side-chain hydroxyl groups is determined.

Applications

Articles to which a resin material obtained in the above-described manner according to an exemplary embodiment may be applied are not particularly limited and are articles in which surface scratches may be made by contact with another matter. Examples of articles in which surface scratches may be made by contact with another matter include displays of portable devices such as cellular phones and portable game machines; windowpanes; lenses of eyeglasses; windowpanes and bodies of automobiles; recording surfaces of optical discs such as CDs, DVDs, and BDs; solar cell panels and panels for reflecting sunlight; endless belts and rollers for image forming apparatuses that are used for fixing members, intermediate transfer members, recording medium transport members, and the like of image forming apparatuses; floors; and mirrors.

In particular, the resin material according to the exemplary embodiment is suitably used for, for example, fixing belts and fixing rollers in fixing devices; intermediate transfer belts and intermediate transfer rollers in intermediate transfer devices; other recording medium transport belts, recording medium transport rollers, frame surfaces, and the like.

Displays of portable devices such as cellular phones and portable game machines may be scratched by being scraped with fingertips (fingernails) and ends of operation sticks.

For example, windowpanes and the windowpanes and bodies of automobiles, which are exposed to the outdoor environment, may be scratched due to various factors such as contact with sand, leaves, branches, and the like, which are carried by wind, and contact with insects and the like.

For example, in lenses of eyeglasses, small particles (fouling) may adhere to the lens surfaces and wiping of the lenses with dry cloths with the small particles therebetween may cause scratches.

For example, recording surfaces of optical discs such as CDs, DVDs, and BDs may be scratched by being scraped with corners of cases while being taken out of and put into the cases, with corners of apparatuses such as reproduction apparatuses and recording apparatuses while being inserted into and ejected from the apparatuses, and with fingertips (fingernails).

Solar cell panels and panels for reflecting sunlight, which are exposed to the outdoor environment, may be scratched due to various factors such as contact with sand, leaves, branches, and the like, which are carried by wind, and contact with insects and the like.

Endless belts and rollers for image forming apparatuses that are used for fixing members, intermediate transfer members, recording medium transport members, and the like of image forming apparatuses may be scratched by being scraped with recording media such as paper sheets and other members in image forming apparatuses.

The above-described articles are mere examples. In articles that come into contact with another matter, the articles may be scratched in the surfaces thereof by being scraped with the matter.

By disposing a protective film formed from the resin material according to the exemplary embodiment on a surface of an article that comes into contact with another matter, recovery from scratches made by contact with the matter may be efficiently achieved.

Hereinafter, a member for an image forming apparatus including a resin material according to an exemplary embodiment will be described.

Endless Belt

An endless belt for an image forming apparatus according to an exemplary embodiment includes a belt-shaped base member and the resin material according to the exemplary embodiment disposed on the belt-shaped base member.

The endless belt for an image forming apparatus according to the exemplary embodiment has a high capability of recovering from scratches, compared with the cases where the proportion of hydroxyl-group-containing side chains each having 6 or more carbon atoms in an acrylic resin used for polymerization of the resin material does not satisfy the above-described range.

Figure 2:
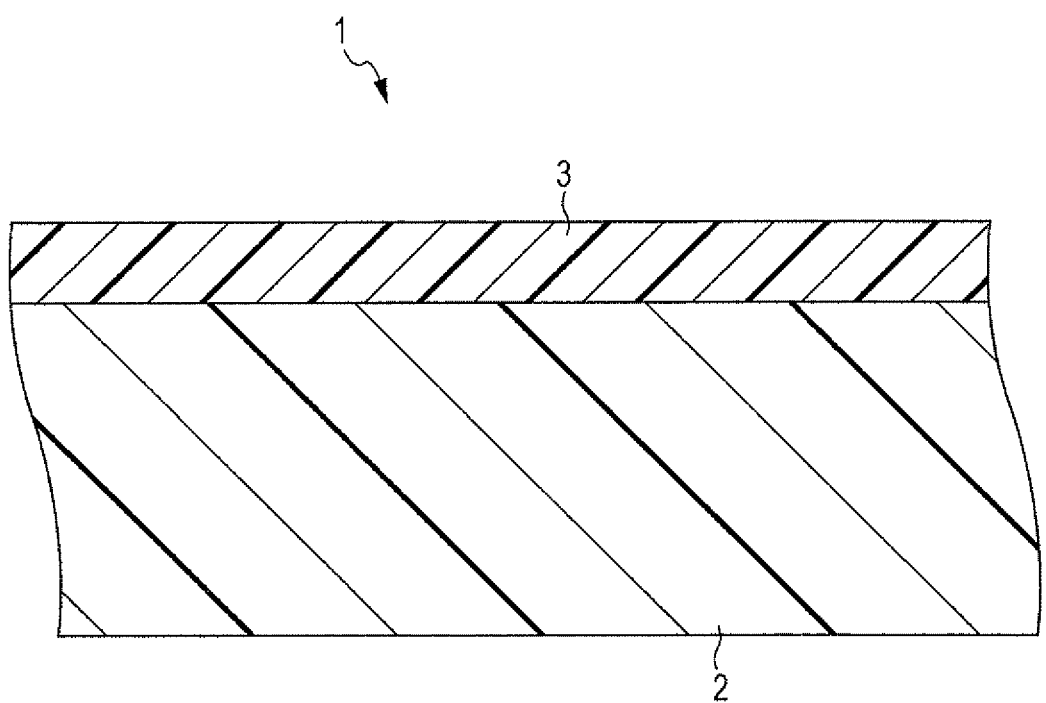
FIG. 2 is a sectional view of an endless belt according to an exemplary embodiment.

FIG. 1 is a perspective (partially cutaway) view of an endless belt according to an exemplary embodiment. FIG. 2 is an end view of the endless belt viewed in the direction of arrow II in FIG. 1.

As illustrated in FIGS. 1 and 2, an endless belt 1 according to an exemplary embodiment is an endless belt including a base member 2 and a surface layer 3 formed on a surface of the base member 2.

For the surface layer 3, the above-described resin material according to an exemplary embodiment is used.

An application of the endless belt 1 is, for example, a fixing belt, an intermediate transfer belt, or a recording medium transport belt in an image forming apparatus.

Hereinafter, a case where the endless belt 1 is used as a fixing belt will be described.

A material used for the base member 2 may be a heat resistant material. Specifically, such a material may be selected from existing various plastic materials and metal materials.

Among plastic materials, those generally referred to as engineering plastics are suitably used. Preferred examples of such engineering plastics include fluorocarbon resins, polyimide (PI), polyamide imide (PAI), polybenzimidazole (PBI), polyether ether ketone (PEEK), polysulfone (PSU), polyether sulfone (PES), polyphenylene sulfide (PPS), polyether imide (PEI), and wholly aromatic polyesters (liquid crystal polymers). Of these, those that are excellent in terms of mechanical strength, heat resistance, wear resistance, chemical resistance, and the like such as thermosetting polyimide, thermoplastic polyimide, polyamide imide, polyether imide, and fluorocarbon resins are preferred.

A metal material used for the base member 2 is not particularly restricted. Various metals and alloy materials may be used. For example, SUS, nickel, copper, aluminum, iron, or the like is suitably used. Such a heat resistant resin and such a metal material may be stacked to form a multilayer structure.

Hereinafter, a case where the endless belt 1 is used as an intermediate transfer belt or a recording medium transport belt will be described.

Examples of a material used for the base member 2 may be polyimide resins, polyamide imide resins, polyester resins, polyamide resins, and fluorocarbon resins. Of these, use of a polyimide resin and a polyamide imide resin is preferred. The base member 2 may include a joint or not as long as the base member 2 is annular (endless). The base member 2 may generally have a thickness of 0.02 to 0.2 mm.

When the endless belt 1 is used as an intermediate transfer belt or a recording medium transport belt of an image forming apparatus, the surface resistivity of the endless belt 1 may be controlled within the range of $1 \times 10^9$ to $1 \times 10^{14}$ ohms per square and the volume resistivity of the endless belt 1 may be controlled within the range of $1 \times 10^8$ to $1 \times 10^{13}$ Ωcm. In order to satisfy these ranges, if necessary, a conductive agent may be added to the base member 2 or the surface layer 3 as described above. An example of such a conductive agent is carbon black such as Ketjenblack or acetylene black; graphite; a metal or an alloy such as aluminum, nickel, or a copper alloy; a metal oxide such as tin oxide, zinc oxide, potassium titanate, a composite oxide of tin oxide-indium oxide, or a composite oxide of tin oxide-antimony oxide; or a conductive polymer such as polyaniline, polypyrrole, polysulfone, or polyacethylene (here, the term "conductive" of the polymer refers to having a volume resistivity of less than $10^7$ Ωam). Such a conductive agent may be used alone or in combination of two or more thereof.

The surface resistivity and the volume resistivity are measured with a UR probe of a Hiresta UPMCP-450 manufactured by DIA Instruments Co., Ltd. in an environment at 22° C. and 55% RH in compliance with JIS-K6911.

In the cases of fixing applications, the endless belt 1 may include an elastic layer between the base member 2 and the surface layer 3. Examples of a material of such an elastic layer include various rubber materials. Examples of such various rubber materials include urethane rubbers, ethylene propylene rubbers (EPM), silicone rubbers, and fluoro rubbers (FKM). In particular, silicone rubbers, which are excellent in terms of heat resistance and processibility, are preferred. Examples of such silicone rubbers include room temperature vulcanization (RTV) silicone rubbers and high temperature vulcanization (HTV) silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ).

When the endless belt 1 is used as a fixing belt in an electromagnetic induction fixing device, a heating layer may be disposed between the base member 2 and the surface layer 3.

A material used for the heating layer is, for example, a nonmagnetic metal. Specific examples of such a nonmagnetic metal include metal materials such as gold, silver, copper, aluminum, zinc, tin, lead, bismuth, beryllium, antimony, and alloys of the foregoing metals (alloys containing the foregoing metals).

The heating layer preferably has a thickness in the range of 5 to 20 μm, more preferably in the range of 7 to 15 μm, and, in particular, preferably in the range of 8 to 12 μm.

Roller

A roller for an image forming apparatus according to an exemplary embodiment includes a tubular base member and the resin material according to the exemplary embodiment disposed on the tubular base member.

The roller for an image forming apparatus according to the exemplary embodiment has a high capability of recovering from scratches, compared with the cases where the proportion of hydroxyl-group-containing side chains each having 6 or more carbon atoms in an acrylic resin used for polymerization of the resin material does not satisfy the above-described range.

Hereinafter, a roller according to an exemplary embodiment will be described. A roller according to an exemplary embodiment is a tubular roller including a base member and a surface layer formed on a surface of the base member.

For the surface layer, the above-described resin material according to an exemplary embodiment is used.

An application of such a tubular roller is, for example, a fixing roller, an intermediate transfer roller, or a recording medium transport roller in an image forming apparatus.

Hereinafter, a case where such a tubular roller is used as a fixing roller will be described.

Figure 4:
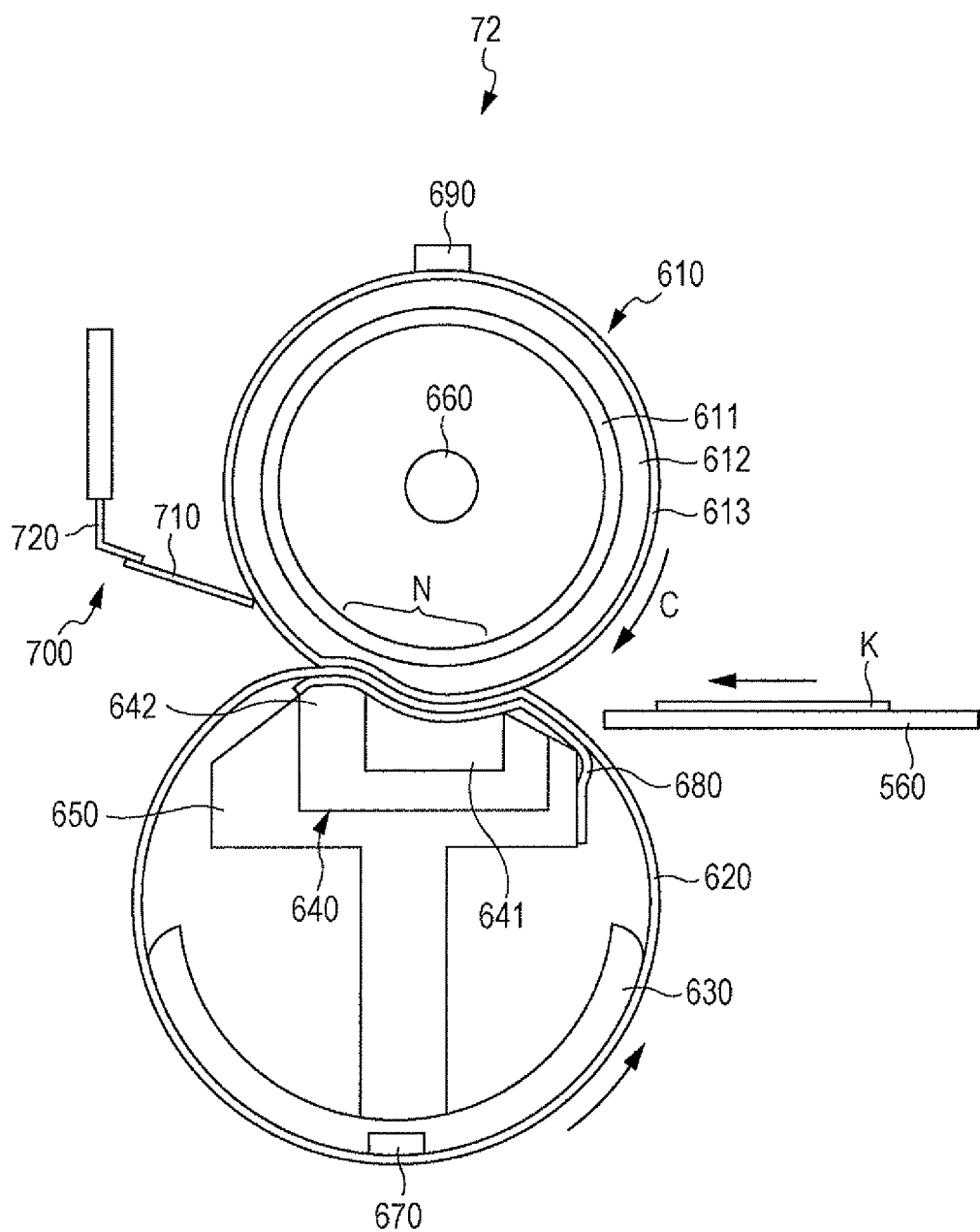
FIG. 4 is a schematic view illustrating the configuration of an image fixing device including an endless belt according to an exemplary embodiment.

A fixing roller 610 illustrated in FIG. 4 and serving as a fixing member is not particularly restricted in terms of shape, structure, size, or the like. The fixing roller 610 includes a tubular core 611 and a surface layer 613 on the tubular core 611. As illustrated in FIG. 4, an elastic layer 612 may be disposed between the core 611 and the surface layer 613.

A material of the tubular core 611 is, for example, a metal such as aluminum (e.g. A-5052 member), SUS, iron, or copper, an alloy, a ceramic, or a fiber reinforced metal (FRN). The tubular core 611 in a fixing device 72 according to an exemplary embodiment is constituted by a tubular member having an outer diameter of 25 mm, a wall thickness of 0.5 mm, and a length of 360 mm.

A material of the elastic layer 612 may be selected from existing materials and any elastic body having high heat resistance may be used. In particular, an elastic body of, for example, a rubber or an elastomer having a rubber hardness of about 15° to 45° (JIS-A) is preferably used. Examples of such an elastic body include silicone rubbers and fluoro rubbers.

In an exemplary embodiment, of these materials, silicone rubbers are preferred in view of small surface tension and excellent elasticity. Examples of such silicone rubbers include RTV silicone rubbers and HTV silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ).

The elastic layer 612 preferably has a thickness of 3 mm or less, more preferably, a thickness in the range of 0.5 to 1.5 mm. In the fixing device 72 according to a first exemplary embodiment, a core is covered with a 72 μm-thick layer composed of a HTV silicone rubber having a rubber hardness of 35° (JIS-A).

The surface layer 613 may have a thickness of, for example, 5 μm or more and 50 μm or less, or 10 μm or more and 30 μm or less.

As for a heating source for heating the fixing roller 610, as described above, for example, a halogen lamp 660 is used. As long as the heating source has a shape and a structure such that the heating source is installed inside the core 611, the heating source is not particularly restricted and is selected in accordance with a purpose. The surface temperature of the fixing roller 610 heated with the halogen lamp 660 is measured with a thermo-sensitive device 690 provided for the fixing roller 610 and the surface temperature is controlled to be constant by a controller. The thermo-sensitive device 690 is not particularly restricted and may be a thermistor, a temperature sensor, or the like.

Image Forming Apparatus and Image Fixing Device

An image fixing device according to an exemplary embodiment includes a first rotational body and a second rotational body that is in contact with the first rotational body to form a nipping region in which a recording medium is nipped between the first rotational body and the second rotational body, wherein at least one of the first rotational body and the second rotational body is the endless belt for an image forming apparatus according to the above-described exemplary embodiment or the roller for an image forming apparatus according to the above-described exemplary embodiment.

The image fixing device according to the exemplary embodiment provides fixed images having high image quality, compared with the cases where the proportion of hydroxyl-group-containing side chains each having 6 or more carbon atoms in an acrylic resin used for polymerization of the resin material does not satisfy the above-described range.

An image forming apparatus according to an exemplary embodiment includes an electrostatic latent image carrier; an electrostatic latent image forming section that forms an electrostatic latent image on a surface of the electrostatic latent image carrier; a developing section that develops the electrostatic latent image by using toner to form a toner image; a transfer section that transfers the toner image on the electrostatic latent image carrier onto a recording medium; and the image fixing device according to the above-described exemplary embodiment that fixes the transferred toner image on the recording medium.

The image forming apparatus according to the exemplary embodiment provides images having high image quality, compared with the cases where the proportion of hydroxyl-group-containing side chains each having 6 or more carbon atoms in an acrylic resin used for polymerization of the resin material does not satisfy the above-described range.

An image forming apparatus according to another exemplary embodiment includes an electrostatic latent image carrier; an electrostatic latent image forming section that forms an electrostatic latent image on a surface of the electrostatic latent image carrier; a developing section that develops the electrostatic latent image by using toner to form a toner image; an intermediate transfer body that includes the endless belt for an image forming apparatus according to the above-described exemplary embodiment or the roller for an image forming apparatus according to the above-described exemplary embodiment; a first transfer section that transfers the toner image on the electrostatic latent image carrier onto the intermediate transfer body; and a second transfer section that transfers the toner image on the intermediate transfer body onto a recording medium.

The image forming apparatus according to the exemplary embodiment provides images having high image quality, compared with the cases where the proportion of hydroxyl-group-containing side chains each having 6 or more carbon atoms in an acrylic resin used for polymerization of the resin material does not satisfy the above-described range.

An image forming apparatus according to another exemplary embodiment includes an electrostatic latent image carrier; an electrostatic latent image forming section that forms an electrostatic latent image on a surface of the electrostatic latent image carrier; a developing section that develops the electrostatic latent image by using toner to form a toner image; a recording medium transport body that transports a recording medium and includes the endless belt for an image forming apparatus according to the above-described exemplary embodiment or the roller for an image forming apparatus according to the above-described exemplary embodiment; and a transfer section that transfers the toner image on the electrostatic latent image carrier onto the recording medium on the recording medium transport body.

The image forming apparatus according to the exemplary embodiment provides images having high image quality, compared with the cases where the proportion of hydroxyl-group-containing side chains each having 6 or more carbon atoms in an acrylic resin used for polymerization of the resin material does not satisfy the above-described range.

First Exemplary Embodiment

Figure 3:
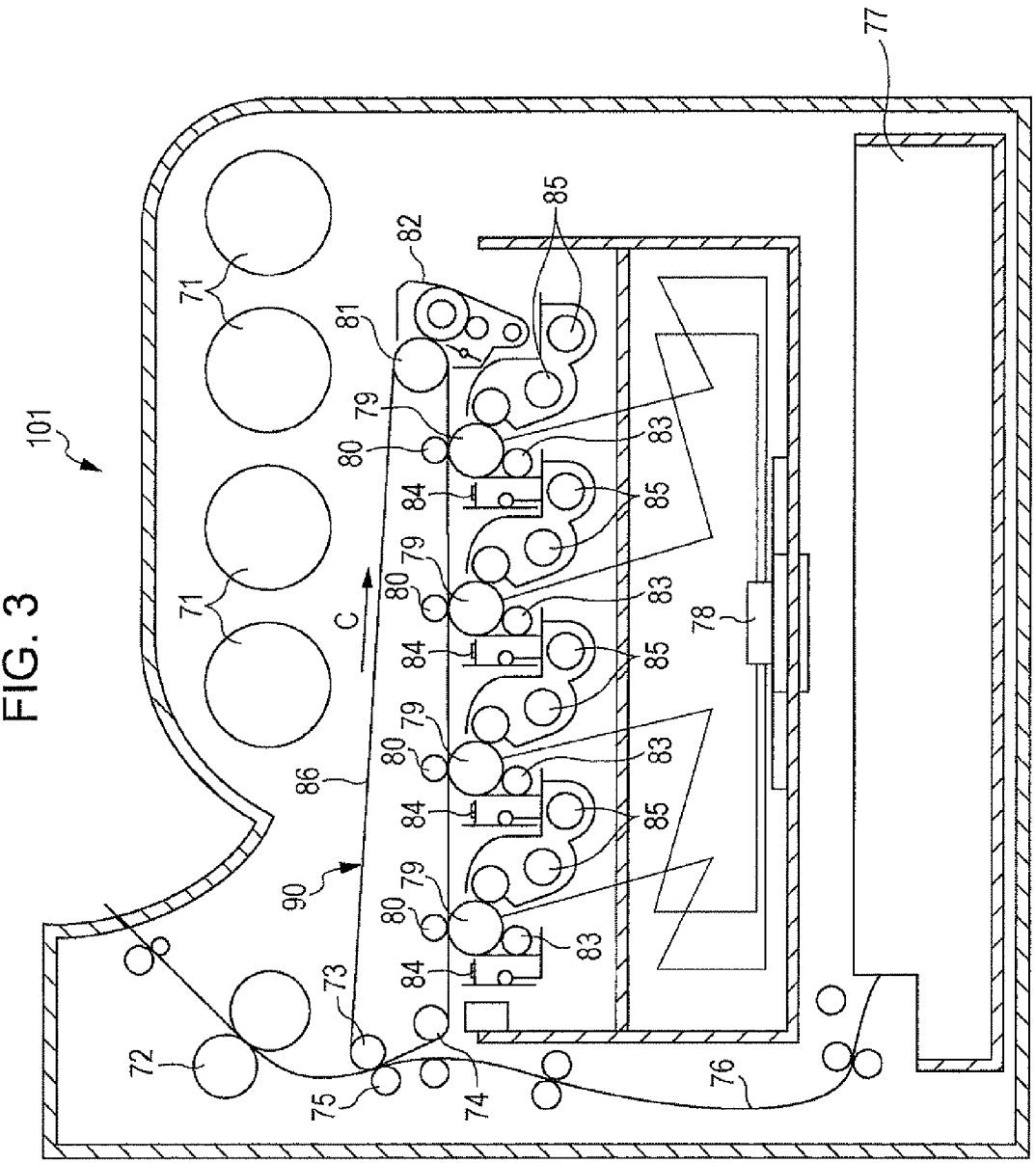
FIG. 3 is a schematic view illustrating the configuration of an image forming apparatus including an endless belt according to an exemplary embodiment.

Hereinafter, an image forming apparatus according to a first exemplary embodiment including an endless belt according to an exemplary embodiment and a roller according to an exemplary embodiment will be described. FIG. 3 is a schematic view for illustrating a portion of a tandem-system image forming apparatus including an endless belt according to an exemplary embodiment serving as a pressure belt of a fixing device, an endless belt according to an exemplary embodiment serving as an intermediate transfer belt, and a roller according to an exemplary embodiment serving as a fixing roller of the fixing device.

Specifically, an image forming apparatus 101 includes a photoconductor body 79 (electrostatic latent image carrier), a charging roller 83 for charging the surface of the photoconductor body 79, a laser generating device 78 (electrostatic latent image forming part) for forming an electrostatic latent image by exposing the surface of the photoconductor body 79, a developing device 85 (developing part) for developing the latent image formed on the surface of the photoconductor body 79 by using a developer to form a toner image, an intermediate transfer belt 86 (intermediate transfer body) onto which the toner image formed by the developing device 85 is transferred from the photoconductor body 79, a first transfer roller 80 (first transfer part) for transferring the toner image onto the intermediate transfer belt 86, a photoconductor-body cleaning member 84 for removing toner, foreign particles, and the like adhering to the photoconductor body 79, a second transfer roller 75 (second transfer part) for transferring the toner image on the intermediate transfer belt 86 onto a recording medium, and the fixing device 72 (fixing part) for fixing the toner image on the recording medium. As illustrated in FIG. 3, the first transfer roller 80 may be disposed immediately above the photoconductor body 79. Alternatively, the first transfer roller 80 may be disposed at a position displaced with respect to the position immediately above the photoconductor body 79.

The configuration of the image forming apparatus 101 illustrated in FIG. 3 will be described further in detail.

In the image forming apparatus 101, the charging roller 83, the developing device 85, the first transfer roller 80 disposed beyond the intermediate transfer belt 86, and the photoconductor-body cleaning member 84 are disposed counterclockwise around the photoconductor body 79. Such members constitute a developing unit corresponding to a single color. A toner cartridge 71 for supplying a developer to the developing device 85 is provided for each developing unit. The laser generating device 78 is disposed for the photoconductor bodies 79 of the developing units. The laser generating device 78 irradiates a surface portion of each photoconductor body 79 with laser light in accordance with image information, the surface portion being downstream of the charging roller 83 (in the direction in which the photoconductor body 79 is rotated) and upstream of the developing device 85.

Four developing units corresponding to four colors (for example, cyan, magenta, yellow, and black) are horizontally arranged in a line in the image forming apparatus 101. The intermediate transfer belt 86 is disposed so as to be passed through transfer regions between the photoconductor bodies 79 and the first transfer rollers 80 of the four developing units. The intermediate transfer belt 86 is supported by a support roller 73, a support roller 74, and a driving roller 81 that are sequentially disposed counterclockwise inside the intermediate transfer belt 86. Thus, a belt support device 90 is provided. The four first transfer rollers 80 are disposed downstream of the support roller 73 (in the direction in which the intermediate transfer belt 86 is rotated) and upstream of the support roller 74. A transfer cleaning member 82 for cleaning the outer peripheral surface of the intermediate transfer belt 86 is disposed opposite the driving roller 81 through the intermediate transfer belt 86 so as to be in contact with the driving roller 81.

The second transfer roller 75 for transferring a toner image formed on the outer peripheral surface of the intermediate transfer belt 86 onto a surface of a recording paper sheet transported from a paper sheet supplying section 77 through a paper sheet path 76 is disposed opposite the support roller 73 through the intermediate transfer belt 86 so as to be in contact with the support roller 73.

The paper sheet supplying section 77 that contains recording media is provided in a bottom portion of the image forming apparatus 101. A recording medium is supplied from the paper sheet supplying section 77 so as to be passed through the paper sheet path 76 and the nip between the support roller 73 and the second transfer roller 75 that constitute a second transfer unit. The recording medium having been passed through the nip is further transported by a transport part (not shown) so as to be passed through the nip of the fixing device 72. Finally, the recording medium is discharged from the image forming apparatus 101.

Hereinafter, a method for forming an image by using the image forming apparatus 101 illustrated in FIG. 3 will be described. The formation of a toner image is performed in each developing unit. The surface of the photoconductor body 79 being rotated counterclockwise is charged with the charging roller 83. Then, a latent image (electrostatic latent image) is formed on the charged surface of the photoconductor body 79 by using the laser generating device 78 (exposure device). Then, the latent image is developed with a developer supplied from the developing device 85 to form a toner image. The toner image having been transported to the nip between the first transfer roller 80 and the photoconductor body 79 is transferred onto the outer peripheral surface of the intermediate transfer belt 86 being rotated in the direction represented by arrow C. The photoconductor body 79 after the transfer of a toner image is subjected to cleaning of toner, foreign particles, and the like adhering to the surface of the photoconductor body 79 by using the photoconductor-body cleaning member 84. Thus, the photoconductor body 79 is prepared for the next formation of a toner image.

The toner images developed by the developing units corresponding to colors are sequentially stacked on the outer peripheral surface of the intermediate transfer belt 86 so as to correspond to image information. The thus-stacked toner images are transported to a second transfer unit and transferred by the second transfer roller 75 onto a surface of a recording paper sheet having been transported from the paper sheet supplying section 77 through the paper sheet path 76. The recording paper sheet onto which the toner images have been transferred is then pressed and heated when the recording paper sheet is passed through the nip of the fixing device 72. As a result, the toner images are fixed to form an image on the surface of the recording medium. Then, the recording medium is discharged from the image forming apparatus.

Fixing Device (Image Fixing Device)

FIG. 4 is a schematic view of the configuration of the fixing device 72 installed in the image forming apparatus 101 according to an exemplary embodiment. The fixing device 72 illustrated in FIG. 4 includes the fixing roller 610 serving as a rotational body that is driven so as to rotate, an endless belt 620 (pressure belt), and a pressure pad 640 serving as a pressing member configured to press the fixing roller 610 through the endless belt 620. It will suffice that the pressure pad 640 presses the endless belt 620 and the fixing roller 610 toward each other. Accordingly, the endless belt 620 may be pressed by the fixing roller 610 or the fixing roller 610 may be pressed by the endless belt 620.

The halogen lamp 660 serving as an example of a heating part for heating unfixed toner images in a nipping region is disposed inside the fixing roller 610. The heating part is not restricted to a halogen lamp and another heating member generating heat may be used.

The thermo-sensitive device 690 is disposed on the surface of the fixing roller 610 so as to be in contact with the fixing roller 610. Turning on of the halogen lamp 660 is controlled on the basis of temperature values measured with the thermo-sensitive device 690 to maintain the surface temperature of the fixing roller 610 to be a specified temperature (for example, 150° C.).

The endless belt 620 is rotatably supported by the pressure pad 640, a belt running guide 630, and an edge guide (not shown), the pressure pad 640 and the belt running guide 630 being disposed inside the endless belt 620. In a nipping region N, the endless belt 620 is disposed under pressure so as to be in contact with the fixing roller 610.

The pressure pad 640 is disposed inside the endless belt 620 so as to press the fixing roller 610 through the endless belt 620. Thus, the pressure pad 640 and the fixing roller 610 form the nipping region N therebetween. In the pressure pad 640, a pre-nipping member 641 for providing a wide nipping region N is disposed on the entrance side of the nipping region N and a peeling nipping member 642 for distorting the fixing roller 610 is disposed on the exit side of the nipping region N.

To decrease the sliding resistance between the inner circumferential surface of the endless belt 620 and the pressure pad 640, a low-friction sheet 680 is disposed on the surfaces of the pre-nipping member 641 and the peeling nipping member 642, the surfaces being in contact with the endless belt 620. The pressure pad 640 and the low-friction sheet 680 are held by a metal holder 650.

The holder 650 is equipped with the belt running guide 630 so that the endless belt 620 is rotated smoothly. Specifically, since the inner circumferential surface of the endless belt 620 slides against the belt running guide 630, the belt running guide 630 is composed of a material having a low coefficient of static friction. In addition, the material of the belt running guide 630 has a low thermal conductivity such that the belt running guide 630 is less likely to deprive the endless belt 620 of heat.

The fixing roller 610 is rotated in the direction represented by arrow C by a driving motor (not shown). Such rotation drives the endless belt 620 in a direction opposite to the direction in which the fixing roller 610 is rotated. That is, the fixing roller 610 is rotated clockwise in FIG. 4, whereas the endless belt 620 is rotated counterclockwise.

A paper sheet K including unfixed toner images is guided by a fixing entrance guide 560 and transported to the nipping region N. When the paper sheet K is then passed through the nipping region N, the toner images on the paper sheet K are fixed by pressure applied to the nipping region N and heat supplied by the fixing roller 610.

In the fixing device 72, the pre-nipping member 641 having a recess conforming to the outer circumferential surface of the fixing roller 610 provides the nipping region N.

In the fixing device 72 according to an exemplary embodiment, by disposing the peeling nipping member 642 so as to project toward the outer circumferential surface of the fixing roller 610, the distortion of the fixing roller 610 is locally made large in the exit region of the nipping region N. In such a configuration, after fixing, the paper sheet K is peeled from the fixing roller 610.

A peeling member 700 serving as a peeling auxiliary part is disposed downstream of the nipping region N, for the fixing roller 610. In the peeling member 700, a peeling baffle 710 is held in a direction (counter direction) intersecting the direction in which the fixing roller 610 is rotated, by a holder 720 so as to be in close proximity to the fixing roller 610.

Hereinafter, members other than the endless belt 620 and the fixing roller 610 in the fixing device 72 according to an exemplary embodiment will be described in detail.

As described above, the pressure pad 640 disposed inside the endless belt 620 includes the pre-nipping member 641 and the peeling nipping member 642. The pressure pad 640 is supported by the holder 650 such that a spring or an elastic body presses the fixing roller 610 with a load of, for example, 32 kgf. A surface of the pressure pad 640, the surface facing the fixing roller 610, is formed so as to have a recessed curve conforming to the outer circumferential surface of the fixing roller 610. The pre-nipping member 641 and the peeling nipping member 642 may be composed of a material having heat resistance.

The shape and the material of the pressure pad 640 disposed inside the endless belt 620 are not particularly restricted as long as the pressure pad 640 functions to press the fixing roller 610 through the endless belt 620 and to form the nipping region N through which a paper sheet K including an unfixed toner image is passed between the endless belt 620 and the fixing roller 610. In addition to the pressure pad 640, for example, a pressure roller configured to press the fixing roller 610 while being rotated may also be disposed.

As for the pre-nipping member 641, a heat resistant elastomer such as a silicone rubber or a fluoro rubber or an elastic body such as a leaf spring is used. Of such materials, a silicone rubber is preferred in view of excellent elasticity. Examples of such a silicone rubber include RTV silicone rubbers and HTV silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ). A silicone rubber having a JIS-A hardness of 10° to 40° is preferably used in view of hardness. The shape, structure, size, and the like of such an elastic body are not particularly restricted and are selected in accordance with a purpose. In the fixing device 72 according to an exemplary embodiment, a silicone rubber member having a width of 10 mm, a thickness of 5 mm, and a length of 320 mm is used.

The peeling nipping member 642 is composed of a heat resistant resin such as PPS (polyphenylene sulfide), polyimide, polyester, or polyamide; or a metal such as iron, aluminum, or SUS. As for the shape of the peeling nipping member 642, the peeling nipping member 642 is formed so as to have an outer shape in the nipping region N, the outer shape being a convex curved surface having a certain radius of curvature. In the fixing device 72 according to an exemplary embodiment, the endless belt 620 is wrapped around the fixing roller 610 at a wrapping angle of 40° by using the pressure pad to form the nipping region N having a width of 8 mm.

The low-friction sheet 680 is disposed in order to decrease the sliding resistance (frictional resistance) between the inner circumferential surface of the endless belt 620 and the pressure pad 640. For the low-friction sheet 680, a material having a low coefficient of friction and being excellent in terms of wear resistance and heat resistance is suitably used.

Examples of a material for the low-friction sheet 680 include various materials such as metals, ceramics, and resins. Specific examples of such materials include heat resistant resins such as fluorocarbon resins, polyether sulfone (PES), polybutylene terephthalate (PBT), liquid crystal polymers (LCP), polyphenylene sulfide (PPS), and polyethylene terephthalate (PET); natural materials of nylon 6 and natural materials of nylon 6.6; and materials in which carbon, glass fiber, or the like is added to the foregoing materials.

In particular, a fluorocarbon resin sheet in which a surface being in contact with the endless belt 620 has a low sliding resistance against the inner circumferential surface of the endless belt 620 and a surface on which lubricant is held has micro-irregularities is preferred.

Specifically, for example, a PTFE resin sheet formed by sintering, a glass fiber sheet impregnated with Teflon (registered trademark), a laminate sheet in which a skived film sheet composed of a fluorocarbon resin is sandwiched by heat sealing between glass fiber sheets, or a fluorocarbon resin sheet in which streak-shaped irregularities are formed is used.

The low-friction sheet 680 may be formed as an independent member separate from the pre-nipping member 641 and the peeling nipping member 642. Alternatively, the low-friction sheet 680 may be integrally formed together with the pre-nipping member 641 and the peeling nipping member 642.

A lubricant applying member 670 is also disposed in the holder 650 so as to extend in the longitudinal direction of the fixing device 72. The lubricant applying member 670 is disposed so as to be in contact with the inner circumferential surface of the endless belt 620 and supplies an appropriate amount of a lubricant to the endless belt 620. Thus, the lubricant is supplied to the portion where the endless belt 620 slides against the low-friction sheet 680 and the sliding resistance between the endless belt 620 and the pressure pad 640 through the low-friction sheet 680 is further decreased. In this way, smooth rotation of the endless belt 620 is achieved. The lubricant applying member 670 also provides an effect of suppressing wear of the inner circumferential surface of the endless belt 620 and the surface of the low-friction sheet 680.

Such a lubricant may be a silicone oil. An example of such a silicone oil is a dimethyl silicone oil, an organometallic-salt-added dimethyl silicone oil, a hindered-amine-added dimethyl silicone oil, an organometallic-salt-and-hindered-amine-added dimethyl silicone oil, a methylphenyl silicone oil, an amino-modified silicone oil, an organometallic-salt-added amino-modified silicone oil, a hindered-amine-added amino-modified silicone oil, a carboxy-modified silicone oil, a silanol-modified silicone oil, a sulfonic-acid-modified silicone oil, or the like. Of these, an amino-modified silicone oil, which has excellent wettability, is preferably used.

In the image fixing device 72 according to an exemplary embodiment, the lubricant applying member 670 is used to supply a lubricant to the inner circumferential surface of the endless belt 620. Alternatively, a configuration in which a lubricant applying member and a lubricant are not used may be employed.

A methylphenyl silicone oil, a fluorocarbon oil (a perfluoropolyether oil or a modified perfluoropolyether oil), or the like is suitably used. An anti-oxidizing agent may be added to a silicone oil. A synthetic lubricant oil grease in which a solid substance and a liquid are mixed together such as a silicone grease, a fluorocarbon grease, or a combination of such greases may be used. In the fixing device 72 according to an exemplary embodiment, an amino-modified silicone oil having a viscosity of 300 cs (KF96 manufactured by Shin-Etsu Chemical Co., Ltd.) is used.

As described above, the inner circumferential surface of the endless belt 620 slides against the belt running guide 630. Thus, the belt running guide 630 may be composed of a material having a low coefficient of friction and a low thermal conductivity such that the belt running guide 630 is less likely to deprive the endless belt 620 of heat. Accordingly, a heat resistant resin such as PFA or PPS is used.

In the image forming apparatus 101 according to an exemplary embodiment, an endless belt according to the above-described exemplary embodiment is used as the endless belt 620 of the fixing device 72. However, an endless belt according to the above-described exemplary embodiment may be used as the intermediate transfer belt 86.

Second Exemplary Embodiment

An image forming apparatus according to a second exemplary embodiment has a configuration in which, instead of the fixing device 72 disposed in the image forming apparatus 101 according to the first exemplary embodiment, a fixing device including a fixing belt including a heating source (the fixing belt being an endless belt according to an exemplary embodiment) and a pressure roller (a roller according to an exemplary embodiment) is used. Since the second exemplary embodiment is the same as the first exemplary embodiment except that the different fixing device is used, descriptions of the common features are omitted.

Fixing Device (Image Fixing Device)

Figure 5:
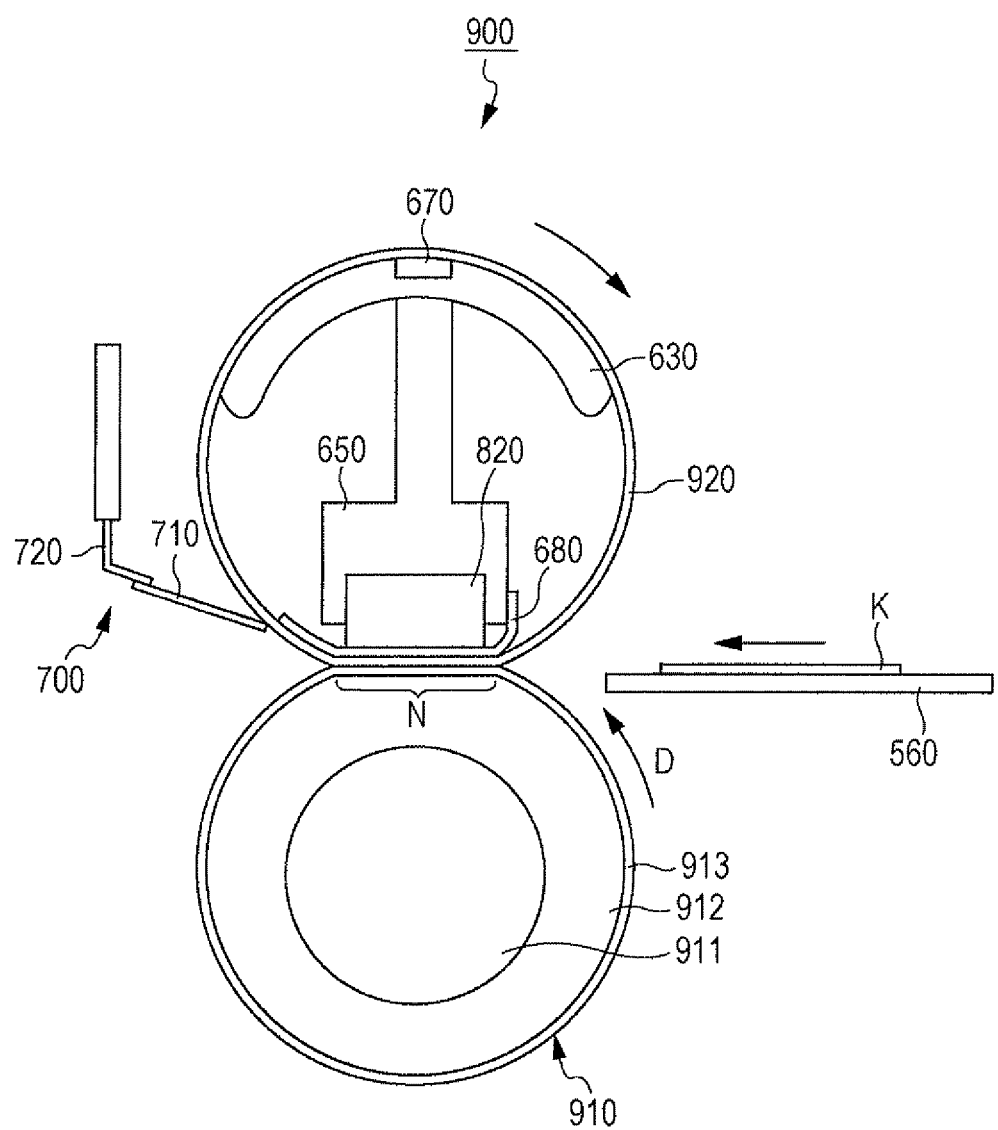
FIG. 5 is a schematic view illustrating the configuration of an image fixing device including an endless belt according to another exemplary embodiment.

FIG. 5 is a schematic view of the configuration of a fixing device according to the second exemplary embodiment. Specifically, FIG. 5 illustrates a fixing device including an endless belt according to an exemplary embodiment serving as a fixing belt and a roller according to an exemplary embodiment serving as a pressure roller. Components similar to those in the fixing device according to the first exemplary embodiment are denoted with the same reference numerals and detailed descriptions of such components are omitted.

As illustrated in FIG. 5, a fixing device 900 according to the second exemplary embodiment includes a fixing belt 920, which is an endless belt, and a pressure roller 910 serving as an example of a rotational body that is driven so as to rotate. The fixing belt 920 has the same configuration as the above-described endless belt 620.

The fixing belt 920 is disposed so as to face a surface of the paper sheet K, the surface holding a toner image. A ceramic heater 820 that is a heating resistor serving as an example of a heating part is disposed inside the fixing belt 920. The ceramic heater 820 is configured to supply heat to the nipping region N.

As for the ceramic heater 820, a surface facing the pressure roller 910 is formed so as to be flat. The ceramic heater 820 is disposed so as to press the pressure roller 910 through the fixing belt 920 to form the nipping region N. Thus, the ceramic heater 820 also functions as a pressing member. The paper sheet K having been passed through the nipping region N is peeled from the fixing belt 920 in the exit region (peeling nipping region) of the nipping region N due to change in the curvature of the fixing belt 920.

To decrease the sliding resistance between the inner circumferential surface of the fixing belt 920 and the ceramic heater 820, a low-friction sheet 680 is disposed between the inner circumferential surface of the fixing belt 920 and the ceramic heater 820. The low-friction sheet 680 may be formed as an independent member separate from the ceramic heater 820. Alternatively, the low-friction sheet 680 may be integrally formed together with the ceramic heater 820.

The pressure roller 910 is disposed so as to face the fixing belt 920. The pressure roller 910 is rotated in the direction represented by arrow D by a driving motor (not shown). Such rotation causes the fixing belt 920 to rotate. The pressure roller 910 includes a stack of a core (cylindrical metal core) 911, a heat-resistant elastic layer 912 covering the outer circumferential surface of the core 911, and a release layer 913 that is a heat-resistant resin coating or a heat-resistant rubber coating. If necessary, each layer is made semiconductive by addition of carbon black or the like thereto to address offsetting of toner.

The peeling member 700 serving as a peeling auxiliary part may be disposed downstream of the nipping region N, for the fixing belt 920. In the peeling member 700, the peeling baffle 710 is held in a direction (counter direction) intersecting the direction in which the fixing belt 920 is rotated, by the holder 720 so as to be in close proximity to the fixing belt 920.

The paper sheet K including unfixed toner images is guided by the fixing entrance guide 560 and transported to the nipping region N of the fixing device 900. When the paper sheet K is passed through the nipping region N, the toner images on the paper sheet K are fixed by pressure applied to the nipping region N and heat supplied by the ceramic heater 820 disposed on the fixing belt 920 side of the fixing device 900.

Here, in the fixing device 900 according to an exemplary embodiment, the pressure roller 910 is formed so as to have a reverse crown shape (flaring shape) in which the outer diameters of the two end portions are larger than the outer diameter of the central portion. The fixing belt 920 has an irregularly shaped structure in the inner surface. This irregularly shaped structure is configured to deform in the nipping region so as to expand in conformity to the surface shape of the pressure roller 910. In such a configuration, when a paper sheet is passed through the nipping region, a tensile force is applied by the pressure roller 910 in the width direction from the central portion to the two end portions of the paper sheet. Thus, the paper sheet is stretched and the length of the fixing belt 920 in the surface width direction is increased.

Accordingly, in the fixing device 900 according to an exemplary embodiment, slipping of the fixing belt 920 against the paper sheet K is suppressed in the entire region from the central portion to the two end portions of the fixing belt 920.

As for the heating source, other than the ceramic heater 820, a halogen lamp disposed inside the fixing belt 920 or an electromagnetic induction coil that is disposed inside or outside of the fixing belt 920 and generates heat by electromagnetic induction may be used.

In addition to the flat pressure member, for example, a pressure roller configured to press the pressure roller 910 while being rotated may also be disposed inside the fixing belt 920.

Third Exemplary Embodiment

Hereinafter, an image forming apparatus according to a third exemplary embodiment including an endless belt according to an exemplary embodiment serving as a paper-sheet transport belt will be described.

Figure 6:
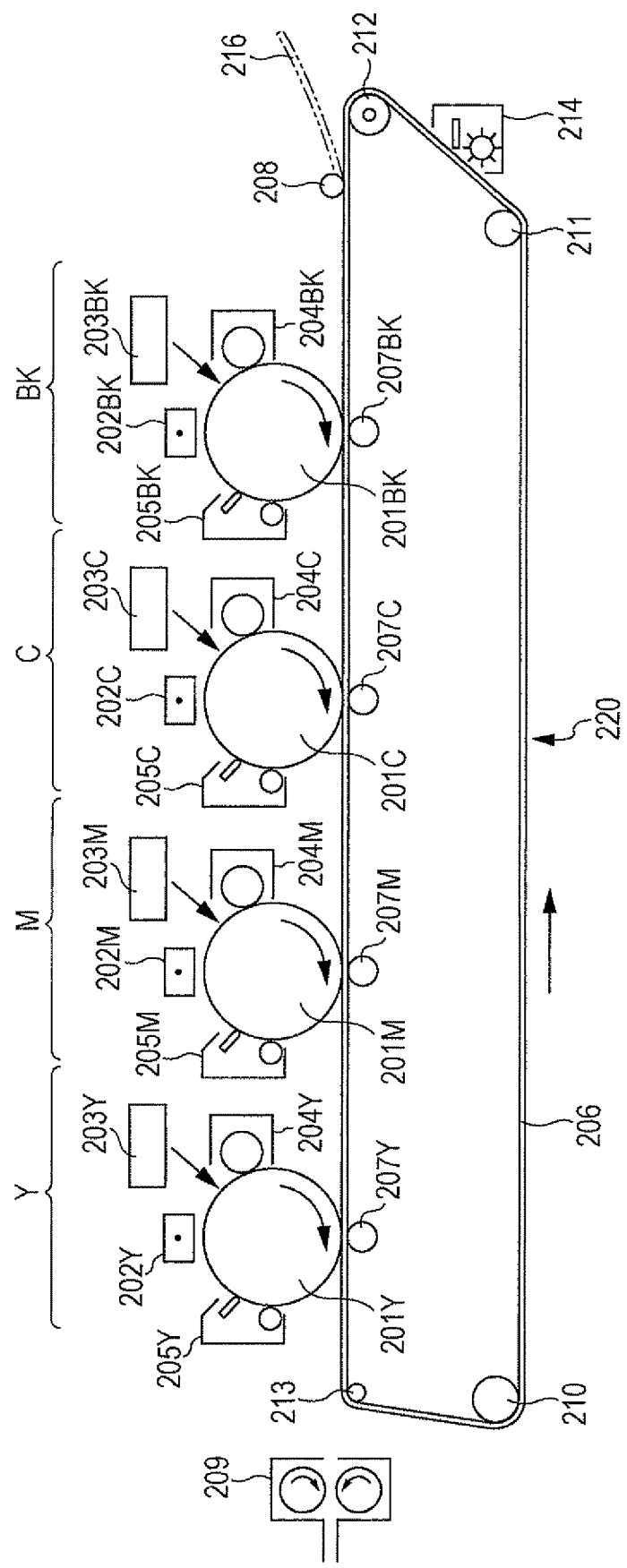
FIG. 6 is a schematic view illustrating the configuration of an image forming apparatus including an endless belt according to an exemplary embodiment, the endless belt serving as a paper-sheet transport belt.

FIG. 6 is a schematic view illustrating an image forming apparatus according to the third exemplary embodiment. In the image forming apparatus illustrated in FIG. 6, units Y, M, C, and BK respectively include photoconductor drums 201Y, 201M, 201C, and 201BK that are configured to rotate in the clockwise directions indicated by arrows. In the proximity of the photoconductor drums 201Y, 201M, 201C, and 201BK, charging devices 202Y, 202M, 202C, and 202BK, exposing devices 203Y, 203M, 203C, and 203BK, developing devices corresponding to colors (yellow developing device 204Y, magenta developing device 204M, cyan developing device 204C, and black developing device 204BK), and photoconductor-drum cleaning members 205Y, 205M, 205C, and 205BK are respectively disposed.

The units Y, M, C, and BK are arranged in parallel with a paper-sheet transport belt 206 in the sequence of the units BK, C, M, and Y. However, for example, the sequence of the units BK, Y, C, and M may be set to an appropriate sequence in accordance with an image forming method.

The paper-sheet transport belt 206 is supported by belt support rollers 210, 211, 212, and 213 disposed inside the paper-sheet transport belt 206. Thus, a belt support device 220 for the image forming apparatus is provided. The paper-sheet transport belt 206 is configured to be rotated in a counter-clockwise direction indicated by arrow at the same peripheral velocity as that of the photoconductor drums 201Y, 201M, 201C, and 201BK. The paper-sheet transport belt 206 is disposed such that a portion of the paper-sheet transport belt 206, the portion being between the belt support rollers 212 and 213, is in contact with the photoconductor drums 201Y, 201M, 201C, and 201BK. A belt cleaning member 214 is provided for the paper-sheet transport belt 206.

Transfer rollers 207Y, 207M, 207C, and 207BK are respectively disposed inside the paper-sheet transport belt 206 and at positions so as to face positions where the paper-sheet transport belt 206 and the photoconductor drums 201Y, 201M, 201C, and 201BK are in contact with each other. Thus, the transfer rollers 207Y, 207M, 207C, and 207BK, the photoconductor drums 201Y, 201M, 201C, and 201BK, and the paper-sheet transport belt 206 form transfer regions where toner images are transferred onto a paper sheet (receiver) 216. As illustrated in FIG. 6, the transfer rollers 207Y, 207M, 207C, and 207BK may be respectively disposed immediately below the photoconductor drums 201Y, 201M, 201C, and 201BK. Alternatively, the transfer rollers 207Y, 207M, 207C, and 207BK may be respectively disposed at positions displaced with respect to the positions immediately below the photoconductor drums 201Y, 201M, 201C, and 201BK.

A fixing device 209 is disposed such that the paper sheet is transported to the fixing device 209 after the paper sheet is passed through the transfer regions formed between the paper-sheet transport belt 206 and the photoconductor drums 201Y, 201M, 201C, and 201BK.

The paper sheet 216 is transported to the paper-sheet transport belt 206 by a paper-sheet transport roller 208.

In the image forming apparatus according to the third exemplary embodiment illustrated in FIG. 6, in the unit BK, the photoconductor drum 201BK is driven so as to be rotated. Such rotation operatively drives the charging device 202BK and the charging device 202BK charges the surface of the photoconductor drum 201BK such that the surface has an intended polarity and potential. The photoconductor drum 201BK whose surface is thus charged is then subjected to image exposure by using the exposing device 203BK. Thus, an electrostatic latent image is formed on the surface of the photoconductor drum 201BK.

Subsequently, the electrostatic latent image is developed with the black developing device 204BK. Thus, a toner image is formed on the surface of the photoconductor drum 201BK. A developer used at this time may be a single component developer or a two component developer.

The thus-formed toner image is passed through the transfer region formed between the photoconductor drum 201BK and the paper-sheet transport belt 206. The paper sheet 216 is electrostatically attracted to the paper-sheet transport belt 206 and transported to the transfer region. The toner image is sequentially transferred onto a surface of the paper sheet 216 by an electric field formed by a transfer bias applied from the transfer roller 207BK.

After that, toner remaining on the photoconductor drum 201BK is cleaned and removed by the photoconductor-drum cleaning member 205BK. Thus, the photoconductor drum 201BK is prepared for the next image transfer.

The above-described image transfer is also performed in the units C, M, and Y in the above-described manner.

The paper sheet 216 onto which toner images have been transferred by the transfer rollers 207BK, 207C, 207M, and 207Y is then transported to the fixing device 209 and the toner images are fixed on the paper sheet 216.

As a result, an intended image is formed on the paper sheet.

Hereinafter, other applications will be described.

Portable Devices

A resin material according to an exemplary embodiment is applicable as a protective film for a display that displays images in a portable device at least including the display.

Displays (for example, liquid crystal displays) of portable devices such as cellular phones and portable game machines may be scratched by being scraped with fingertips (fingernails) during operation and ends of operation sticks (if present). In contrast, by using a resin material according to an exemplary embodiment as a protective film, even when scratches are made, recovery from the scratches is achieved and hence formation of scratches that remain permanently in a surface (permanent scratches) is efficiently suppressed.

Windowpanes and Bodies of Automobiles

A resin material according to an exemplary embodiment is applicable as a protective film for a windowpane of a building, an automobile, or the like. A resin material according to an exemplary embodiment is applicable as a protective film for the body of an automobile.

For example, windowpanes of buildings and windowpanes and bodies of automobiles, which are exposed to the outdoor environment, may be scratched due to various factors such as contact with sand, leaves, branches, and the like, which are carried by wind, and contact with insects, and the like. In contrast, by using a resin material according to an exemplary embodiment as a protective film, even when scratches are made, recovery from the scratches is achieved and hence formation of scratches that remain permanently in a surface (permanent scratches) is efficiently suppressed.

Lenses of Eyeglasses

A resin material according to an exemplary embodiment is applicable as a protective film for a lens of an eyeglass.

In lenses of eyeglasses, small particles (fouling) may adhere to the surfaces of the lenses and wiping of the lenses with dry cloths with the small particles therebetween may cause scratches. In contrast, by using a resin material according to an exemplary embodiment as a protective film, even when scratches are made, recovery from the scratches is achieved and hence formation of scratches that remain permanently in a surface (permanent scratches) is efficiently suppressed.

Optical Discs

A resin material according to an exemplary embodiment is applicable as a protective film for a recording surface of an optical disc.

For example, recording surfaces of optical discs such as CDs, DVDs, and BDs may be scratched by being scraped with corners of cases while being taken out of and put into the cases, with corners of apparatuses such as reproduction apparatuses and recording apparatuses while being inserted into and ejected from the apparatuses, and with fingertips (fingernails). As a result, scratches in the recording surfaces may cause reading errors. In contrast, by using a resin material according to an exemplary embodiment as a protective film, even when scratches are made, recovery from the scratches is achieved and hence formation of scratches that remain permanently in a surface (permanent scratches) is efficiently suppressed. As a result, the occurrence of reading errors is also efficiently suppressed.

Sunlight Panels

A resin material according to an exemplary embodiment is applicable as a protective film for a reflecting surface of a sunlight panel.

Solar cell panels and panels for reflecting sunlight, which are exposed to the outdoor environment, may be scratched due to various factors such as contact with sand, leaves, branches, and the like, which are carried by wind, and contact with insects and the like. In contrast, by using a resin material according to an exemplary embodiment as a protective film, even when scratches are made, recovery from the scratches is achieved and hence formation of scratches that remain permanently in a surface (permanent scratches) is efficiently suppressed.

EXAMPLES

Hereinafter, exemplary embodiments according to the present invention will be described in detail with reference to examples. However, the present invention is not restricted to the examples described below. In the following description, "parts" and "%" are based on mass unless otherwise specified.

Preparation of Sample Resin Layer

Example 1

Synthesis of Acrylic Resin Prepolymer A1

A monomer solution composed of 9 parts of hydroxyethyl methacrylate (HEMA) serving as a monomer providing side-chain hydroxyl groups each having 2 carbon atoms, 81 parts of PLACCEL FM2 (manufactured by DAICEL CHEMICAL INDUSTRIES, LTD., compound name: lactone-modified methacrylate) serving as a monomer providing long-side-chain hydroxyl groups each having 14 carbon atoms, 10 parts of butyl methacrylate (BMA) serving as a monomer having no hydroxyl groups, 6 parts of a polymerization initiator (azobisisobutyronitrile (AIBN)), and 100 parts of methyl ethyl ketone is charged into a dropping funnel and dropped into 100 parts of methyl ethyl ketone that is heated to 80° C. and being stirred over three hours under nitrogen flow to polymerize the monomers. Furthermore, a solution composed of 50 parts of methyl ethyl ketone and 2 parts of AIBN is dropped to this reaction solution over an hour and the resultant solution is stirred for an hour to complete the reaction. During the reaction, the reaction solution is maintained at 80° C. and stirred. The reaction solution is concentrated so as to have a concentration of 40%. As a result, an acrylic resin prepolymer solution A1 in which an acrylic resin prepolymer is dissolved in the solvent is synthesized.

In the obtained acrylic resin prepolymer A1, the proportion of the long-side-chain hydroxyl groups relative to all of the side-chain hydroxyl groups is described in Table 1.

Preparation of Composition A1

The following solutions A1 and C1 are mixed together to prepare a composition A1.

Solution A1 (methyl ethyl ketone solution of the above-described acrylic resin prepolymer A1; concentration of the acrylic resin prepolymer A1: 40% by mass; hydroxyl value: 163): 100 parts Solution C1 (isocyanate, manufactured by Asahi Kasei Chemicals Corporation; product name: Duranate TPA100; compound name: hexamethylene diisocyanate-based polyisocyanurate): 22 parts Formation of Resin Layer Sample A1

The composition A1 is defoamed under a reduced pressure for 10 minutes and then applied (cast) onto, for example, a polyimide film having a thickness of 90 μm. After that, the cast composition is heated at 85° C. for an hour and at 160° C. for 60 minutes to cure the composition. Thus, a resin layer sample A1 having a thickness of 40 μm is obtained.

Example 2

Synthesis of Acrylic Resin Prepolymer A2

An acrylic resin prepolymer A2 is synthesized in the same manner as the synthesis of the acrylic resin prepolymer A1 except that the amount of hydroxyethyl methacrylate added is changed to 4 parts and the amount of PLACCEL FM2 added is changed to 87 parts.

In the obtained acrylic resin prepolymer A2, the proportion of the long-side-chain hydroxyl groups relative to all of the side-chain hydroxyl groups is described in Table 1.

Preparation of Composition A2

A composition A2 is obtained in the same manner as the composition A1 except that the following solution A2 is used instead of the solution A1 and the amount of the solution C1 added is changed to an amount described below.

Solution A2 (methyl ethyl ketone solution of the above-described acrylic resin prepolymer A2; concentration of the acrylic resin prepolymer A2: 40% by mass; hydroxyl value: 151): 100 parts Solution C1 (isocyanate, manufactured by Asahi Kasei Chemicals Corporation; product name: Duranate TPA100; compound name: hexamethylene diisocyanate-based polyisocyanurate): 20 parts Formation of Resin Layer Sample A2

A resin layer sample A2 having a thickness of 40 μm is obtained in the same manner as the resin layer sample A1 except that the composition A2 is used instead of the composition A1.

Example 3

Synthesis of Acrylic Resin Prepolymer A3

An acrylic resin prepolymer A3 is synthesized in the same manner as the synthesis of the acrylic resin prepolymer A1 except that hydroxyethyl methacrylate is not used and the amount of PLACCEL FM2 added is changed to 91 parts.

In the obtained acrylic resin prepolymer A3, the proportion of the long-side-chain hydroxyl groups relative to all of the side-chain hydroxyl groups is described in Table 1.

Preparation of Composition A3

A composition A3 is obtained in the same manner as the composition A1 except that the following solution A3 is used instead of the solution A1 and the amount of the solution C1 added is changed to an amount described below.

Solution A3 (methyl ethyl ketone solution of the above-described acrylic resin prepolymer A3; concentration of the acrylic resin prepolymer A3: 40% by mass; hydroxyl value: 142): 100 parts Solution C1 (isocyanate, manufactured by Asahi Kasei Chemicals Corporation; product name: Duranate TPA100; compound name: hexamethylene diisocyanate-based polyisocyanurate): 20 parts Formation of Resin Layer Sample A3

A resin layer sample A3 having a thickness of 40 μm is obtained in the same manner as the resin layer sample A1 except that the composition A3 is used instead of the composition A1.

Example 4

Synthesis of Acrylic Resin Prepolymer A4

A monomer solution composed of 80 parts of PLACCEL FM2 (manufactured by DAICEL CHEMICAL INDUSTRIES, LTD., compound name: lactone-modified methacrylate) serving as a monomer providing long-side-chain hydroxyl groups each having 14 carbon atoms, 20 parts of CHEMINOX FAMAC6 (manufactured by UNIMATEC CO., LTD., compound name: 2-(perfluorohexyl)ethyl methacrylate) serving as a monomer having no hydroxyl groups and containing fluorine atoms, 6 parts of a polymerization initiator (azobisisobutyronitrile (AIBN)), and 100 parts of methyl ethyl ketone is charged into a dropping funnel and dropped into 100 parts of methyl ethyl ketone that is heated to 80° C. and being stirred over three hours under nitrogen flow to polymerize the monomers. Furthermore, a solution composed of 50 parts of methyl ethyl ketone and 2 parts of AIBN is dropped to this reaction solution over an hour and the resultant solution is stirred for an hour to complete the reaction. During the reaction, the reaction solution is maintained at 80° C. and stirred. The reaction solution is concentrated so as to have a concentration of 40%. As a result, an acrylic resin prepolymer A4 in which an acrylic resin prepolymer is dissolved in the solvent is synthesized.

In the obtained acrylic resin prepolymer A4, the proportion of the long-side-chain hydroxyl groups relative to all of the side-chain hydroxyl groups and the proportion of the side chains containing a fluorine atom relative to all the side chains in the acrylic resin are described in Table 1.

Preparation of Composition A4

A composition A4 is obtained in the same manner as the composition A1 except that the following solution A4 is used instead of the solution A1 and the amount of the solution C1 added is changed to an amount described below.

Solution A4 (methyl ethyl ketone solution of the above-described acrylic resin prepolymer A4; concentration of the acrylic resin prepolymer A4: 40% by mass; hydroxyl value: 125): 100 parts Solution C1 (isocyanate, manufactured by Asahi Kasei Chemicals Corporation; product name: Duranate TPA100; compound name: hexamethylene diisocyanate-based polyisocyanurate): 16 parts Formation of Resin Layer Sample A4

A resin layer sample A4 having a thickness of 40 μm is obtained in the same manner as the resin layer sample A1 except that the composition A4 is used instead of the composition A1.

Example 5

Synthesis of Acrylic Resin Prepolymer A5

A monomer solution composed of 80 parts of PLACCEL FM2 (manufactured by DAICEL CHEMICAL INDUSTRIES, LTD., compound name: lactone-modified methacrylate) serving as a monomer providing long-side-chain hydroxyl groups each having 14 carbon atoms, 4 parts of butyl methacrylate (BMA) serving as a monomer having no hydroxyl groups, 16 parts of SILAPLANE FM0711 (manufactured by Chisso Corporation) serving as a monomer having no hydroxyl groups and having a siloxane bond, 6 parts of a polymerization initiator (azobisisobutyronitrile (AIBN)), and 100 parts of methyl ethyl ketone is charged into a dropping funnel and dropped into 100 parts of methyl ethyl ketone that is heated to 80° C. and being stirred over three hours under nitrogen flow to polymerize the monomers. Furthermore, a solution composed of 50 parts of methyl ethyl ketone and 2 parts of AIBN is dropped to this reaction solution over an hour and the resultant solution is stirred for an hour to complete the reaction. During the reaction, the reaction solution is maintained at 80° C. and stirred. The reaction solution is concentrated so as to have a concentration of 40%. As a result, an acrylic resin prepolymer A5 in which an acrylic resin prepolymer is dissolved in the solvent is synthesized.

The monomer having a siloxane bond is represented by the general formula (A) above where $R^1$ represents a butyl group, $R^2$ represents a butyl group, and $R^3$ represents a propyl methacrylate group, and has a number-average molecular weight of 1000.

In the obtained acrylic resin prepolymer A5, the proportion of the long-side-chain hydroxyl groups relative to all of the side-chain hydroxyl groups and the proportion of the monomer having a siloxane bond relative to all the monomers used for synthesizing the acrylic resin are described in Table 1.

Preparation of Composition A5

A composition A5 is obtained in the same manner as the composition A1 except that the following solution A5 is used instead of the solution A1 and the amount of the solution C1 added is changed to an amount described below.

Solution A5 (methyl ethyl ketone solution of the above-described acrylic resin prepolymer A5; concentration of the acrylic resin prepolymer A5: 40% by mass; hydroxyl value: 125): 100 parts Solution C1 (isocyanate, manufactured by Asahi Kasei Chemicals Corporation; product name: Duranate TPA100; compound name: hexamethylene diisocyanate-based polyisocyanurate): 16 parts Formation of Resin Layer Sample A5

A resin layer sample A5 having a thickness of 40 μm is obtained in the same manner as the resin layer sample A1 except that the composition A5 is used instead of the composition A1.

Example 6

Synthesis of Acrylic Resin Prepolymer A6

A monomer solution composed of 67 parts of PLACCEL FM2 (manufactured by DAICEL CHEMICAL INDUSTRIES, LTD., compound name: lactone-modified methacrylate) serving as a monomer providing long-side-chain hydroxyl groups each having 14 carbon atoms, 17 parts of CHEMINOX FAMAC6 (manufactured by UNIMATEC CO., LTD., compound name: 2-(perfluorohexyl)ethyl methacrylate), 16 parts of SILAPLANE FM0711 (manufactured by Chisso Corporation) serving as a monomer having no hydroxyl groups and having a siloxane bond, 6 parts of a polymerization initiator (azobisisobutyronitrile (AIBN)), and 100 parts of methyl ethyl ketone is charged into a dropping funnel and dropped into 100 parts of methyl ethyl ketone that is heated to 80° C. and being stirred over three hours under nitrogen flow to polymerize the monomers. Furthermore, a solution composed of 50 parts of methyl ethyl ketone and 2 parts of AIBN is dropped to this reaction solution over an hour and the resultant solution is stirred for an hour to complete the reaction. During the reaction, the reaction solution is maintained at 80° C. and stirred. The reaction solution is concentrated so as to have a concentration of 40%. As a result, an acrylic resin prepolymer A6 in which an acrylic resin prepolymer is dissolved in the solvent is synthesized.

In the obtained acrylic resin prepolymer A6, the proportion of the long-side-chain hydroxyl groups relative to all of the side-chain hydroxyl groups, the proportion of the side chains containing a fluorine atom relative to all the side chains in the acrylic resin, and the proportion of the monomer having a siloxane bond relative to all the monomers used for synthesizing the acrylic resin are described in Table 1.

Preparation of Composition A6

A composition A6 is obtained in the same manner as the composition A1 except that the following solution A6 is used instead of the solution A1 and the amount of the solution C1 added is changed to an amount described below.

Solution A6 (methyl ethyl ketone solution of the above-described acrylic resin prepolymer A6; concentration of the acrylic resin prepolymer A6: 40% by mass; hydroxyl value: 104): 100 parts Solution C1 (isocyanate, manufactured by Asahi Kasei Chemicals Corporation; product name: Duranate TPA100; compound name: hexamethylene diisocyanate-based polyisocyanurate): 14 parts Formation of Resin Layer Sample A6

A resin layer sample A6 having a thickness of 40 μm is obtained in the same manner as the resin layer sample A1 except that the composition A6 is used instead of the composition A1.

Example 7

Synthesis of Acrylic Resin Prepolymer A7

An acrylic resin prepolymer A7 is synthesized in the same manner as the synthesis of the acrylic resin prepolymer A1 except that 100 parts of PLACCEL FM3 (manufactured by DAICEL CHEMICAL INDUSTRIES, LTD., compound name: lactone-modified methacrylate) serving as a monomer providing long-side-chain hydroxyl groups each having 21 carbon atoms is used instead of hydroxyethyl methacrylate, PLACCEL FM2, and butyl methacrylate.

In the obtained acrylic resin prepolymer A7, the proportion of the long-side-chain hydroxyl groups relative to all of the side-chain hydroxyl groups is described in Table 1.

Preparation of Composition A7

A composition A7 is obtained in the same manner as the composition A1 except that the following solution A7 is used instead of the solution A1 and the amount of the solution C1 added is changed to an amount described below.

Solution A7 (methyl ethyl ketone solution of the above-described acrylic resin prepolymer A7; concentration of the acrylic resin prepolymer A7: 40% by mass; hydroxyl value: 119): 100 parts Solution C1 (isocyanate, manufactured by Asahi Kasei Chemicals Corporation; product name: Duranate TPA100; compound name: hexamethylene diisocyanate-based polyisocyanurate): 16 parts Formation of Resin Layer Sample A7

A resin layer sample A7 having a thickness of 40 μl is obtained in the same manner as the resin layer sample A1 except that the composition A7 is used instead of the composition A1.

Example 8

Synthesis of Acrylic Resin Prepolymer A8

A monomer solution composed of 3 parts of hydroxyethyl methacrylate (HEMA) serving as a monomer providing side-chain hydroxyl groups each having 2 carbon atoms, 73 parts of PLACCEL FM2 (manufactured by DAICEL CHEMICAL INDUSTRIES, LTD., compound name: lactone-modified methacrylate) serving as a monomer providing long-side-chain hydroxyl groups each having 14 carbon atoms, 24 parts of CHEMINOX FAMAC6 (manufactured by UNIMATEC CO., LTD., compound name; 2-(perfluorohexyl)ethyl methacrylate) serving as a monomer having no hydroxyl groups and containing fluorine atoms, 6 parts of a polymerization initiator (azobisisobutyronitrile (AIBN)), and 100 parts of methyl ethyl ketone is charged into a dropping funnel and dropped into 100 parts of methyl ethyl ketone that is heated to 80° C. and being stirred over three hours under nitrogen flow to polymerize the monomers. Furthermore, a solution composed of 50 parts of methyl ethyl ketone and 2 parts of AIBN is dropped to this reaction solution over an hour and the resultant solution is stirred for an hour to complete the reaction. During the reaction, the reaction solution is maintained at 80° C. and stirred. The reaction solution is concentrated so as to have a concentration of 40%. As a result, an acrylic resin prepolymer solution A8 in which an acrylic resin prepolymer is dissolved in the solvent is synthesized.

In the obtained acrylic resin prepolymer A8, the proportion of the long-side-chain hydroxyl groups relative to all of the side-chain hydroxyl groups and the proportion of the side chains containing a fluorine atom relative to all the side chains in the acrylic resin are described in Table 1.

Preparation of Composition A8

A composition A8 is obtained in the same manner as the composition A1 except that the following solution A8 is used instead of the solution A1 and the amount of the solution C1 added is changed to an amount described below.

Solution A8 (methyl ethyl ketone solution of the above-described acrylic resin prepolymer A8; concentration of the acrylic resin prepolymer A8: 40% by mass; hydroxyl value: 126): 100 parts Solution C1 (isocyanate, manufactured by Asahi Kasei Chemicals Corporation; product name: Duranate TPA100; compound name: hexamethylene diisocyanate-based polyisocyanurate): 16 parts Formation of Resin Layer Sample A8

A resin layer sample A8 having a thickness of 40 μm is obtained in the same manner as the resin layer sample A1 except that the composition A8 is used instead of the composition A1.

Example 9

Synthesis of Acrylic Resin Prepolymer A9

A monomer solution composed of 2 parts of hydroxyethyl methacrylate (HEMA) serving as a monomer providing side-chain hydroxyl groups each having 2 carbon atoms, 61 parts of PLACCEL FM2 (manufactured by DAICEL CHEMICAL INDUSTRIES, LTD., compound name: lactone-modified methacrylate) serving as a monomer providing long-side-chain hydroxyl groups each having 14 carbon atoms, 20 parts of CHEMINOX FAMAC6 (manufactured by UNIMATEC CO., LTD., compound name: 2-(perfluorohexyl)ethyl methacrylate) serving as a monomer having no hydroxyl groups and containing fluorine atoms, 16 parts of SILAPLANE FM0711 (manufactured by Chisso Corporation) serving as a monomer having no hydroxyl groups and having a siloxane bond, 6 parts of a polymerization initiator (azobisisobutyronitrile (AIBN)), and 100 parts of methyl ethyl ketone is charged into a dropping funnel and dropped into 100 parts of methyl ethyl ketone that is heated to 80° C. and being stirred over three hours under nitrogen flow to polymerize the monomers. Furthermore, a solution composed of 50 parts of methyl ethyl ketone and 2 parts of AIBN is dropped to this reaction solution over an hour and the resultant solution is stirred for an hour to complete the reaction. During the reaction, the reaction solution is maintained at 80° C. and stirred. The reaction solution is concentrated so as to have a concentration of 40%. As a result, an acrylic resin prepolymer solution A9 in which an acrylic resin prepolymer is dissolved in the solvent is synthesized.

In the obtained acrylic resin prepolymer A9, the proportion of the long-side-chain hydroxyl groups relative to all of the side-chain hydroxyl groups, the proportion of the side chains containing a fluorine atom relative to all the side chains in the acrylic resin, and the proportion of the monomer having a siloxane bond relative to all the monomers used for synthesizing the acrylic resin are described in Table 1.

Preparation of Composition A9

A composition A9 is obtained in the same manner as the composition A1 except that the following solution A9 is used instead of the solution A1 and the amount of the solution C1 added is changed to an amount described below.

Solution A9 (methyl ethyl ketone solution of the above-described acrylic resin prepolymer A9; concentration of the acrylic resin prepolymer A9: 40% by mass; hydroxyl value: 105): 100 parts Solution C1 (isocyanate, manufactured by Asahi Kasei Chemicals Corporation; product name: Duranate TPA100; compound name: hexamethylene diisocyanate-based polyisocyanurate): 14 parts Formation of Resin Layer Sample A9

A resin layer sample A9 having a thickness of 40 µm is obtained in the same manner as the resin layer sample A1 except that the composition A9 is used instead of the composition A1.

Example 10

Synthesis of Acrylic Resin Prepolymer A10

A monomer solution composed of 3 parts of hydroxyethyl methacrylate (HEMA) serving as a monomer providing side-chain hydroxyl groups each having 2 carbon atoms, 66 parts of PLACCEL FM2 (manufactured by DAICEL CHEMICAL INDUSTRIES, LTD., compound name: lactone-modified methacrylate) serving as a monomer providing long-side-chain hydroxyl groups each having 14 carbon atoms, 22 parts of CHEMINOX FAMAC6 (manufactured by UNIMATEC CO., LTD., compound name: 2-(perfluorohexyl)ethyl methacrylate) serving as a monomer having no hydroxyl groups and containing fluorine atoms, 8 parts of SILAPLANE FM0711 (manufactured by Chisso Corporation) serving as a monomer having no hydroxyl groups and having a siloxane bond, 6 parts of a polymerization initiator (azobisisobutyronitrile (AIBN)), and 100 parts of methyl ethyl ketone is charged into a dropping funnel and dropped into 100 parts of methyl ethyl ketone that is heated to 80° C. and being stirred over three hours under nitrogen flow to polymerize the monomers. Furthermore, a solution composed of 50 parts of methyl ethyl ketone and 2 parts of AIBN is dropped to this reaction solution over an hour and the resultant solution is stirred for an hour to complete the reaction. During the reaction, the reaction solution is maintained at 80° C. and stirred. The reaction solution is concentrated so as to have a concentration of 40%. As a result, an acrylic resin prepolymer solution A10 in which an acrylic resin prepolymer is dissolved in the solvent is synthesized.

In the obtained acrylic resin prepolymer A10, the proportion of the long-side-chain hydroxyl groups relative to all of the side-chain hydroxyl groups, the proportion of the side chains containing a fluorine atom relative to all the side chains in the acrylic resin, and the proportion of the monomer having a siloxane bond relative to all the monomers used for synthesizing the acrylic resin are described in Table 1.

Preparation of Composition A10

A composition A10 is obtained in the same manner as the composition A1 except that the following solution A10 is used instead of the solution A1 and the amount of the solution C1 added is changed to an amount described below.

Solution A10 (methyl ethyl ketone solution of the above-described acrylic resin prepolymer A10; concentration of the acrylic resin prepolymer A10: 40% by mass; hydroxyl value: 115): 100 parts Solution C1 (isocyanate, manufactured by Asahi Kasei Chemicals Corporation; product name: Duranate TPA100; compound name: hexamethylene diisocyanate-based polyisocyanurate): 15 parts Formation of Resin Layer Sample A10

A resin layer sample A10 having a thickness of 40 µm is obtained in the same manner as the resin layer sample A1 except that the composition A10 is used instead of the composition A1.

Example 11

Synthesis of Acrylic Resin Prepolymer A11

A monomer solution composed of 3 parts of hydroxyethyl methacrylate (HEMA) serving as a monomer providing side-chain hydroxyl groups each having 2 carbon atoms, 69 parts of PLACCEL FM2 (manufactured by DAICEL CHEMICAL INDUSTRIES, LTD., compound name: lactone-modified methacrylate) serving as a monomer providing long-side-chain hydroxyl groups each having 14 carbon atoms, 12 parts of CHEMINOX FAMAC6 (manufactured by UNIMATEC CO., LTD., compound name: 2-(perfluorohexyl)ethyl methacrylate) serving as a monomer having no hydroxyl groups and containing fluorine atoms, 16 parts of SILAPLANE FM0711 (manufactured by Chisso Corporation) serving as a monomer having no hydroxyl groups and having a siloxane bond, 6 parts of a polymerization initiator (azobisisobutyronitrile (AIBN)), and 100 parts of methyl ethyl ketone is charged into a dropping funnel and dropped into 100 parts of methyl ethyl ketone that is heated to 80° C. and being stirred over three hours under nitrogen flow to polymerize the monomers. Furthermore, a solution composed of 50 parts of methyl ethyl ketone and 2 parts of AIBN is dropped to this reaction solution over an hour and the resultant solution is stirred for an hour to complete the reaction. During the reaction, the reaction solution is maintained at 80° C. and stirred. The reaction solution is concentrated so as to have a concentration of 40%. As a result, an acrylic resin prepolymer solution A11 in which an acrylic resin prepolymer is dissolved in the solvent is synthesized.

In the obtained acrylic resin prepolymer A11, the proportion of the long-side-chain hydroxyl groups relative to all of the side-chain hydroxyl groups, the proportion of the side chains containing a fluorine atom relative to all the side chains in the acrylic resin, and the proportion of the monomer having a siloxane bond relative to all the monomers used for synthesizing the acrylic resin are described in Table 1.

Preparation of Composition A11

A composition A11 is obtained in the same manner as the composition A1 except that the following solution A11 is used instead of the solution A1 and the amount of the solution C1 added is changed to an amount described below.

Solution A11 (methyl ethyl ketone solution of the above-described acrylic resin prepolymer A11; concentration of the acrylic resin prepolymer A11: 40% by mass; hydroxyl value: 120): 100 parts Solution C1 (isocyanate, manufactured by Asahi Kasei Chemicals Corporation; product name: Duranate TPA100; compound name: hexamethylene diisocyanate-based polyisocyanurate): 16 parts Formation of Resin Layer Sample A11

A resin layer sample A11 having a thickness of 40 μm is obtained in the same manner as the resin layer sample A1 except that the composition A11 is used instead of the composition A1.

Comparative Example 1

Synthesis of Acrylic Resin Prepolymer B1

An acrylic resin prepolymer B1 is synthesized in the same manner as the synthesis of the acrylic resin prepolymer A1 except that the amount of hydroxyethyl methacrylate added is changed to 10 parts and the amount of PLACCEL FM2 added is changed to 81 parts.

In the obtained acrylic resin prepolymer B1, the proportion of the long-side-chain hydroxyl groups relative to all of the side-chain hydroxyl groups is described in Table 1.

Preparation of Composition B1

A composition B1 is obtained in the same manner as the composition A1 except that the following solution B1 is used instead of the solution A1 and the amount of the solution C1 added is changed to an amount described below.

Solution B1 (methyl ethyl ketone solution of the above-described acrylic resin prepolymer B1; concentration of the acrylic resin prepolymer B1: 40% by mass; hydroxyl value: 170): 100 parts Solution C1 (isocyanate, manufactured by Asahi Kasei Chemicals Corporation; product name: Duranate TPA100; compound name: hexamethylene diisocyanate-based polyisocyanurate): 23 parts Formation of Resin Layer Sample B1

A resin layer sample B1 having a thickness of 40 μm is obtained in the same manner as the resin layer sample A1 except that the composition B1 is used instead of the composition A1.

Comparative Example 2

Synthesis of Acrylic Resin Prepolymer B2

An acrylic resin prepolymer B2 is synthesized in the same manner as the synthesis of the acrylic resin prepolymer A4 except that the amount of hydroxyethyl methacrylate added is changed to 10 parts and the amount of PLACCEL FM2 added is changed to 67 parts.

In the obtained acrylic resin prepolymer B2, the proportion of the long-side-chain hydroxyl groups relative to all of the side-chain hydroxyl groups and the proportion of the side chains containing a fluorine atom relative to all the side chains in the acrylic resin are described in Table 1.

Preparation of Composition B2

A composition B2 is obtained in the same manner as the composition A1 except that the following solution B2 is used instead of the solution A1 and the amount of the solution C1 added is changed to an amount described below.

Solution B2 (methyl ethyl ketone solution of the above-described acrylic resin prepolymer B2; concentration of the acrylic resin prepolymer B2: 40% by mass; hydroxyl value: 144): 100 parts Solution C1 (isocyanate, manufactured by Asahi Kasei Chemicals Corporation; product name: Duranate TPA100; compound name: hexamethylene diisocyanate-based polyisocyanurate): 20 parts Formation of Resin Layer Sample B2

A resin layer sample B2 having a thickness of 40 μm is obtained in the same manner as the resin layer sample A1 except that the composition B2 is used instead of the composition A1.

Comparative Example 3

Synthesis of Acrylic Resin Prepolymer B3

An acrylic resin prepolymer B3 is synthesized in the same manner as the synthesis of the acrylic resin prepolymer A5 except that the amount of hydroxyethyl methacrylate added is changed to 11 parts and the amount of PLACCEL FM2 added is changed to 84 parts.

In the obtained acrylic resin prepolymer B3, the proportion of the long-side-chain hydroxyl groups relative to all of the side-chain hydroxyl groups and the proportion of the monomer having a siloxane bond relative to all the monomers used for synthesizing the acrylic resin are described in Table 1.

Preparation of Composition B3

A composition B3 is obtained in the same manner as the composition A1 except that the following solution B3 is used instead of the solution A1 and the amount of the solution C1 added is changed to an amount described below.

Solution B3 (methyl ethyl ketone solution of the above-described acrylic resin prepolymer B3; concentration of the acrylic resin prepolymer B3: 40% by mass; hydroxyl value: 148): 100 parts Solution C1 (isocyanate, manufactured by Asahi Kasei Chemicals Corporation; product name: Duranate TPA100; compound name: hexamethylene diisocyanate-based polyisocyanurate): 21 parts Formation of Resin Layer Sample B3

A resin layer sample B3 having a thickness of 40 μm is obtained in the same manner as the resin layer sample A1 except that the composition B3 is used instead of the composition A1.

Comparative Example 4

Synthesis of Acrylic Resin Prepolymer B4

An acrylic resin prepolymer B4 is synthesized in the same manner as the synthesis of the acrylic resin prepolymer A6 except that the amount of hydroxyethyl methacrylate added is changed to 8 parts and the amount of PLACCEL FM2 added is changed to 70 parts.

In the obtained acrylic resin prepolymer B4, the proportion of the long-side-chain hydroxyl groups relative to all of the side-chain hydroxyl groups, the proportion of the side chains containing a fluorine atom relative to all the side chains in the acrylic resin, and the proportion of the monomer having a siloxane bond relative to all the monomers used for synthesizing the acrylic resin are described in Table 1.

Preparation of Composition B4

A composition. B4 is obtained in the same manner as the composition A6 except that the following solution B4 is used instead of the solution A6 and the amount of the solution C1 added is changed to an amount described below.

Solution B4 (methyl ethyl ketone solution of the above-described acrylic resin prepolymer B4; concentration of the acrylic resin prepolymer B4: 40% by mass; hydroxyl value: 120): 100 parts Solution C1 (isocyanate, manufactured by Asahi Kasei Chemicals Corporation; product name: Duranate TPA100; compound name: hexamethylene diisocyanate-based polyisocyanurate): 16 parts Formation of Resin Layer Sample B4

A resin layer sample B4 having a thickness of 40 μm is obtained in the same manner as the resin layer sample A1 except that the composition B4 is used instead of the composition A1.

Evaluations of Resin Layer Samples
Recovery Proportion

The resin layer samples obtained in Examples and Comparative examples are measured in terms of recovery proportion in a manner described below. The results are described in Table 1.

A FISCHERSCOPE HM2000 (manufactured by Fischer Instruments K.K.) is used as a measurement apparatus. Each resin layer sample is fixed on a slide glass with an adhesive agent and placed in the measurement apparatus. The resin layer sample is subjected to an increasing load up to 0.5 mN over 15 seconds at room temperature (23° C.) and the resin layer sample is held under the load of 0.5 mN for 5 seconds. At this time, the maximum displacement of the resin layer sample is defined as h1. After that, the load is decreased to 0.005 mN over 15 seconds and the resin layer sample is held under the load of 0.005 mN for a minute. At this time, the displacement of the resin layer sample is defined as h2. The recovery proportion (%) is calculated with the following formula: $[(h1-h2)/h1] \times 100 (\%)$.

Evaluation in Terms of Transparency

The resin layer samples obtained in Examples and Comparative examples are visually evaluated in terms of transparency of the resin layers in accordance with an evaluation system below. The results are described in Table 1.

Good: transparent
Fair: cloudy but somewhat transparent
Poor: milky and opaque

Evaluation in Terms of Surface Roughness

The resin layer samples obtained in Examples and Comparative examples are visually evaluated in terms of surface roughness of the resin layers in accordance with an evaluation system described below. The results are described in Table 1.

Good: no surface roughness
Fair: presence of surface roughness in some regions
Poor: presence of surface roughness in all regions Evaluation in Terms of Scratching Caused by Sand The resin layer samples obtained in Examples and Comparative examples are evaluated in the following manner. On each resin layer sample, 1 g of sand is placed and a 100 g weight is placed on the sand and rubbed against the resin layer sample in a reciprocating manner for five cycles to scratch the resin layer sample. The presence of the scratches is visually observed. After that, the resin layer sample is left in an environment at 23° C. and visually inspected as to whether the scratches disappear within 10 seconds or not.

Good: no scratches
Fair: presence of scratches in some regions
Poor: presence of scratches in all regions Evaluation in Terms of Scratching Caused by Steel Wool The resin layer samples obtained in Examples and Comparative examples are evaluated in the following manner. A surface of each resin layer sample is rubbed with steel wool (#0000) under 100 gf in a reciprocating manner for 20 cycles. The haze value of the resin layer sample measured immediately after this rubbing test is defined as Ha. The haze value of the resin layer sample measured before the rubbing test is defined as Hb. Cases where the haze value difference ΔH (ΔH=Ha−Hb) is less than 0 are evaluated as having self-recovery capability (Good). Cases where the haze value difference ΔH (ΔH=Ha−Hb) is 0 or more are evaluated as not having self-recovery capability (Poor).

The haze values are measured with a haze meter (model: NDH2000, manufactured by NIPPON DENSHOKU INDUSTRIES CO., LTD., D65 light source).

Evaluation in Terms of Fouling Resistance
Contact Angle

Contact angles of the resin layer samples obtained in Examples and Comparative examples are measured with respect to water and hexadecane. This measurement is performed with a contact angle meter (model: CA-S ROLL, manufactured by Kyowa Interface Science Co., Ltd.) at 20° C. by the θ/2 method.

Evaluation in Terms of Adhesion of Oil-Based Ink

On each of the resin layer samples obtained in Examples and Comparative examples, a mark is placed with a black oil-based pen, then wiped off with a BEMCOT, and the remaining ink is visually inspected.

Good: ink is completely wiped off and does not remain.
Fair: ink is wiped off but partially remains.
Poor: ink is not wiped off.

Evaluation in Terms of Fouling Resistance in the Air

The resin layer samples obtained in Examples and Comparative examples are left outdoors for 10 days. Water is sprayed onto these samples to which fouling in the air such as sand or dirt adheres and the samples are visually evaluated in terms of remaining fouling.

Excellent: no fouling adhesion
Good: partial fouling adhesion
Poor: fouling adhesion Examples in Terms of Cellular Phone Example A composition prepared by adding the solution C1 to the solution A9 is applied (cast) onto a PET film (CPF50-SA, manufactured by Nippa CO., LTD, thickness: 50 μm) having an adhesive layer. The composition is cured at 85° C. for 30 minutes and at room temperature (23° C.) for 24 hours. Thus, a transparent protective film having a thickness of 100 μm is obtained. This film is attached to a liquid crystal display and a casing portion of a cellular phone (iPhone 4S, manufactured by Apple Inc.). The liquid crystal display and the casing portion are scratched with a fingernail. Recovery from the scratches is achieved within 10 seconds.

TABLE 1

| | | Acrylic resin prepolymer | | | Evaluations of resin layer samples | | |
|---|---|---|---|---|---|---|---|
| | | Proportion of long-side-chain hydroxyl groups relative to all of the side-chain hydroxyl groups (mol %) | Proportion of side chains containing fluorine atom (mol %) | Proportion of monomer having siloxane bond relative to all the monomers used for synthesizing acrylic resin (mass %) | Recovery proportion (%) | Transparency | Surface roughness |
| Example 1 | A1 | 77 | 0 | 0 | 82 | Good | Good |
| Example 2 | A2 | 90 | 0 | 0 | 85 | Good | Good |
| Example 3 | A3 | 100 | 0 | 0 | 88 | Good | Good |
| Example 4 | A4 | 100 | 17 | 0 | 92 | Good | Good |
| Example 5 | A5 | 100 | 0 | 16 | 93 | Good | Good |
| Example 6 | A6 | 100 | 16 | 16 | 95 | Good | Good |
| Example 7 | A7 | 100 | 0 | 0 | 90 | Good | Good |
| Example 8 | A8 | 90 | 20 | 0 | 88 | Good | Good |
| Example 9 | A9 | 90 | 19 | 16 | 92 | Good | Good |
| Example 10 | A10 | 90 | 20 | 8 | 90 | Good | Good |
| Example 11 | A11 | 90 | 10 | 16 | 90 | Good | Good |
| Comparative example 1 | B1 | 75 | 0 | 0 | 60 | Fair | Fair |
| Comparative example 2 | B2 | 75 | 17 | 0 | 45 | Poor | Poor |
| Comparative example 3 | B3 | 75 | 0 | 16 | 54 | Poor | Poor |
| Comparative example 4 | B4 | 75 | 16 | 16 | 33 | Poor | Poor |

The results in Table 1 indicate that the recovery proportion is high and evaluation results in terms of transparency and surface roughness are good in Examples, compared with Comparative examples. The recovery proportion is high in Example 4 in which side chains containing a fluorine atom are present, compared with Comparative example 2. The recovery proportion is high in Example 5 in which side chains having a siloxane bond are present, compared with Comparative example 3. The recovery proportion is high in Example 6 in which side chains containing a fluorine atom and side chains having a siloxane bond are present, compared with Comparative example 4.

TABLE 2

| | | Evaluations of resin layer samples | | | | | |
|---|---|---|---|---|---|---|---|
| | | Evaluation in terms of scratching caused by sand | Evaluation in terms of scratching caused by steel wool | Contact angle [degrees] | | Adhesion of oil-based ink | Fouling resistance in the air |
| | | | | Water | Hexadecane | | |
| Examples | 1 | Good | Good | 81 | 12 | Poor | Poor |
| | 2 | Good | Good | 80 | 12 | Poor | Poor |
| | 3 | Good | Good | 81 | 12 | Poor | Poor |
| | 4 | Good | Good | 105 | 62 | Fair | Excellent |
| | 5 | Good | Good | 100 | 35 | Good | Good |
| | 6 | Good | Good | 102 | 36 | Good | Good |
| | 7 | Good | Good | 80 | 10 | Poor | Poor |
| | 8 | Good | Good | 103 | 60 | Fair | Excellent |
| | 9 | Good | Good | 102 | 38 | Good | Good |
| | 10 | Good | Good | 102 | 42 | Good | Good |
| | 11 | Good | Good | 102 | 36 | Good | Good |
| Comparative examples | 1 | Fair | Poor | 78 | 12 | Poor | Poor |
| | 2 | Poor | Poor | 100 | 55 | Fair | Good |
| | 3 | Fair | Poor | 96 | 31 | Poor | Poor |
| | 4 | Poor | Poor | 100 | 38 | Good | Good |

Comparative Example

A PET film (CPF50-SA, manufactured by Nippa CO., LTD) not coated with the composition is attached to a liquid crystal display and a casing portion of a cellular phone (iPhone 4S, manufactured by Apple Inc.). The liquid crystal display and the casing portion are scratched with a fingernail. Recovery from the scratches does not occur.

Examples in Terms of Windowpane

Example

A composition prepared by adding the solution C1 to the solution A9 is applied onto a windowpane (Float Glass, manufactured by Asahi Glass Co., Ltd., thickness: 3 mm). The composition is cured at 85° C. for 30 minutes and at room temperature (23° C.) for 24 hours. Thus, a transparent protective film having a thickness of 40 µm is formed. A piece of sandpaper (#120, 1 cm×5 cm) is placed on the windowpane having the transparent protective film. A 300 g weight is placed on an end of the sandpaper and the sandpaper is dragged at 1 cm/sec. Generation of scratches is visually observed. Recovery from the scratches is rapidly achieved and no scratches remain.

Comparative Example

A sandpaper (#120, 1 cm×5 cm) is placed on a windowpane (Float Glass, manufactured by Asahi Glass Co., Ltd., thickness: 3 mm). A 300 g weight is placed on an end of the sandpaper and the sandpaper is dragged at 1 cm/sec. Generation of scratches is visually observed.

Examples in Terms of Optical Disc

Example

A composition prepared by adding the solution C1 to the solution A9 is applied (cast) onto a PET film (CPF50-SA, manufactured by Nippa CO., LTD, thickness: 50 µm). The composition is cured at 85° C. for 30 minutes and at room temperature (23° C.) for 24 hours. Thus, a transparent protective film having a thickness of 150 µm is obtained. This transparent protective film is cut into a circle having a diameter of 120 mm and a hole having a diameter of 15 mm is formed in the center of the circle. This transparent protective film is attached to a recording surface of a DVD-R disc (DRD120CPWW, manufactured by Hitachi Maxell, Ltd.) containing video file data. The recording surface of the DVD disc having the protective film thereon is scratched by moving a human fingernail back and forth several times under a load of 600 g in the lateral direction. The presence or absence of scratches is visually confirmed and the video file data in the DVD disc is reproduced to evaluate the protective film. Although scratches are made, recovery from the scratches is rapidly achieved and the video file data in the DVD disc is reproduced without problems.

Comparative Example

A PET film (CPF50-SA, manufactured by Nippa CO., LTD) not coated with the composition is cut into a circle having a diameter of 120 mm and a hole having a diameter of 15 mm is formed in the center of the circle. This PET film is attached to a recording surface of a DVD-R disc (DRD120CPWW, manufactured by Hitachi Maxell, Ltd.) containing video file data. The recording surface of the DVD disc having the PET film thereon is scratched by moving a human fingernail back and forth several times under a load of 600 g in the lateral direction. Generation of scratches is visually confirmed. The video file data in the DVD disc is reproduced with image noise.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin material comprising a polymer of a composition containing an isocyanate and an acrylic resin having OH-group-containing side chains in which the proportion of OH-group-containing side chains each having 6 or more carbon atoms relative to all of the OH-group-containing side chains is 76 mol % or more and 100 mol % or less, and the proportion of OH-group-containing side chains relative to all side chains is greater than 63% by weight.

2. The resin material according to claim 1, wherein the polymer contains one or both of a fluorine atom and a silicon atom.

3. The resin material according to claim 1, wherein the polymer includes a siloxane bond.

4. The resin material according to claim 2, wherein a proportion of side chains containing a fluorine atom relative to all side chains in the acrylic resin is about 5 mol % or more and about 25 mol % or less.

5. The resin material according to claim 1, wherein the acrylic resin has a hydroxyl value of about 30 mgKOH/g or more and about 250 mg KOH/g or less.

6. The resin material according to claim 1, wherein the composition contains a long chain polyol.

7. The resin material according to claim 1, wherein the OH-group-containing side chains each having 6 or more carbon atoms is at least one selected from the group consisting of:

a bifunctional polycaprolactone diol represented by the following general formula (1):

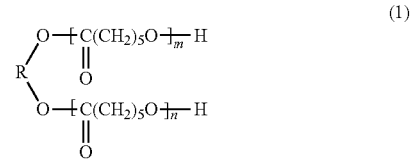

where in the formula (1), R represents any one of $C_2H_4$, $C_2H_4OC_2H_4$, and $C(CH_3)_2(CH_2)_2$, and m and n represent an integer of 4 or more and 35 or less;

a trifunctional polycaprolactone triol represented by the following general formula (2):

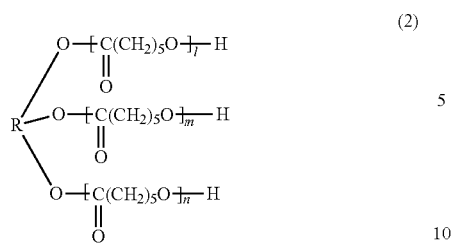
(2)
where in the formula (2), R represents any one of CH$_2$CHCH$_2$, CH$_3$C(CH$_2$)$_2$, and CH$_3$CH$_2$C(CH$_2$)$_3$, and l+m+n satisfies an integer of 3 or more and 30 or less; and
a tetrafunctional polycaprolactone polyol.
* * * * *